US011893616B2

(12) United States Patent
McNall et al.

(10) Patent No.: US 11,893,616 B2
(45) Date of Patent: Feb. 6, 2024

(54) SYSTEM AND METHOD FOR AUTOMATED PREPARATION OF QUOTES AND PROPOSALS

(71) Applicant: ConnectWise, LLC, Tampa, FL (US)

(72) Inventors: Kent McNall, Woodinville, WA (US); Samuel G. Demulling, Snohomish, WA (US)

(73) Assignee: ConnectWise, LLC, Tampa, FL (US)

( * ) Notice: Subject to any disclaimer, the term of this patent is extended or adjusted under 35 U.S.C. 154(b) by 0 days.

(21) Appl. No.: 18/174,779

(22) Filed: Feb. 27, 2023

(65) Prior Publication Data

US 2023/0394544 A1    Dec. 7, 2023

Related U.S. Application Data

(63) Continuation of application No. 17/327,909, filed on May 24, 2021, now Pat. No. 11,593,853, which is a continuation of application No. 16/409,482, filed on May 10, 2019, now Pat. No. 11,017,446, which is a continuation of application No. 14/595,179, filed on Jan. 12, 2015, now Pat. No. 10,290,034, which is a continuation of application No. 13/104,636, filed on May 10, 2011, now Pat. No. 8,935,179.

(60) Provisional application No. 61/333,171, filed on May 10, 2010.

(51) Int. Cl.
G06Q 30/00      (2023.01)
G06Q 30/0601   (2023.01)
G06Q 30/06      (2023.01)
H04L 67/02      (2022.01)

(52) U.S. Cl.
CPC ......... *G06Q 30/0611* (2013.01); *G06Q 30/06* (2013.01); *H04L 67/02* (2013.01)

(58) Field of Classification Search
CPC .......................... G06Q 30/0611; G06Q 30/06
See application file for complete search history.

(56) References Cited

U.S. PATENT DOCUMENTS

| | | | |
|---|---|---|---|
| 7,117,504 B2 | 10/2006 | Smith et al. |
| 9,692,739 B1 | 6/2017 | Harrison, Jr. |
| 2003/0144912 A1 | 7/2003 | McGee |
| 2003/0154101 A1 | 8/2003 | Archibald et al. |
| 2007/0244793 A1 | 10/2007 | Boesel |
| 2009/0198662 A1 | 8/2009 | Prabhakar et al. |

OTHER PUBLICATIONS

Bergman, M., "The Deep Web: Surfacing Hidden Value" Bright Planet—White Paper, Sep. 24, 2001 (17 pages).
Final Office Action on U.S. Appl. No. 14/595,179 dated Jul. 11, 2018.
Non-Final Office Action on U.S. Appl. No. 14/595,179 dated Nov. 22, 2017.
Non-Final Office Action on U.S. Appl. No. 16/409,482 dated Aug. 31, 2020.
Non-Final Office Action on U.S. Appl. No. 17/327,909 dated Sep. 1, 2022.
Notice of Allowance on U.S. Appl. No. 14/595,179 dated Dec. 31, 2018.

(Continued)

*Primary Examiner* — Kathleen Palavecino
(74) *Attorney, Agent, or Firm* — Foley Hoag LLP; John Lanza

(57) ABSTRACT

A system includes a proposal engine configured to present quotes and/or proposals to customers at a network site.

20 Claims, 12 Drawing Sheets

(56) References Cited

OTHER PUBLICATIONS

Notice of Allowance on U.S. Appl. No. 16/409,482 dated Jan. 25, 2021.
Notice of Allowance on U.S. Appl. No. 17/327,909 dated Jan. 19, 2023.

FIG. 5

SYSTEM AND METHOD FOR AUTOMATED PREPARATION OF QUOTES AND PROPOSALS

CROSS-REFERENCE TO RELATED APPLICATIONS

This application claims the benefit of priority under 35 U.S.C. § 120 as a continuation of U.S. patent application Ser. No. 17/327,909, entitled "SYSTEM AND METHOD FOR AUTOMATED PREPARATION OF QUOTES AND PROPOSALS", filed May 24, 2021, which claims the benefit of priority under 35 U.S.C. § 120 as a continuation of U.S. patent application Ser. No. 16/409,482, entitled "SYSTEM AND METHOD FOR AUTOMATED PREPARATION OF QUOTES AND PROPOSALS", filed May 10, 2019, which claims the benefit of priority under 35 U.S.C. § 120 as a continuation of U.S. patent application Ser. No. 14/595,179, entitled "SYSTEM AND METHOD FOR AUTOMATED PREPARATION OF QUOTES AND PROPOSALS", filed Jan. 12, 2015, which claims the benefit of priority under 35 U.S.C. § 120 as a continuation U.S. patent application Ser. No. 13/104,636, entitled "SYSTEM AND METHOD FOR AUTOMATED PREPARATION OF QUOTES AND PROPOSALS", filed May 10, 2011, which claims the benefit of priority under 35 U.S.C. § 119 of U.S. Provisional Patent Application No. 61/333,171, filed May 10, 2010; each of which, to the extent not inconsistent with the disclosure herein, is incorporated by reference herein.

BACKGROUND

Historically, the preparation of quotes and proposals for customers or potential customers has been laborious. Automation has not been applied to the preparation of quotes and proposals, wherein a user may produce an electronic quotation and/or proposal for review and acceptance or modification by a customer or potential customer.

Moreover, it has been found that customer acceptance has been relatively low with respect to viewing quotes and proposals at a network site. Unlike an electronic shopping cart, a quote or proposal is typically prepared for an individual person or company, and the contents of the quote or proposal are typically private. To maintain privacy, it would have been previously necessary to require the customer to login to the network site in order to avoid indexing and subsequent access by web search engines. Customers and potential customers have been found to be resistant to presenting login credentials such as a username and password.

Moreover, even with the use of applications such as word processors or presentation software, it has not been possible for a non-sophisticated user to easily design and/or select proposal content and/or branding of the proposal for a customer.

What is needed is a system and method that can automate preparation of a proposal, make it easy for a non-sophisticated user to select branding and content of a proposal, confidentially present a proposal on a network such as the Internet in a way that does not require a customer to present login credentials, and provide controls for receiving feedback, modification, and/or acceptance of the proposal by the customer.

SUMMARY

According to an embodiment, a system for providing automated quotes and proposals includes at least one server computer including a network communication interface configured for communication with other computers including a client computer across a communication network; a web server operatively coupled to the at least one server computer and configured to interface with a client software application running on the client computer; and a proposal engine operatively coupled to the web server and the client software application or included in the client software application. The system may be configured to receive selections of items corresponding to a proposal from a user via a user interface; generate, select, or receive at least a portion of a Deep Web network address corresponding to the proposal; and cause display of the proposal including the selected items for viewing at the Deep Web network address.

According to an embodiment, a method for providing a quote or proposal to a customer includes receiving, from a user via a network interface from a client software application or via a user interface, a selection of items for a proposal to a customer; receiving, selecting, or generating a Deep Web network address for displaying the proposal; and causing a display of the proposal including the selection of proposed items at the Deep Web network address.

According to an embodiment, a computer readable medium carries computer-executable instructions configured to cause a computer to execute steps for providing a quote or proposal to a customer. The steps include receiving, from a user via a network interface from a client software application or via a user interface, a selection of items for a proposal to a customer; receiving, selecting, or generating a Deep Web network address for displaying the proposal; and causing a display of the proposal including the selection of proposed items at the Deep Web network address.

According to an embodiment, a method for preparing an automated quote or proposal includes receiving, from a user via a user interface into a client software application, a selection of items for a proposal to a customer; transmitting, from the client software application via a network interface to a server, the selection of items, wherein the proposal including the selection of items will be subsequently viewable at a Deep Web network address; and causing the Deep Web network address to be provided to or made accessible to a customer computer for subsequent viewing.

According to an embodiment, a computer readable medium carries computer-executable instructions configured to cause a computer to execute steps for preparing an automated quote or proposal. The steps include receiving, from a user via a user interface into a client software application, a selection of items for a proposal to a customer; transmitting, from the client software application via a network interface to a server, the selection of items, wherein the proposal including the selection of items will be subsequently viewable at a Deep Web network address; and causing the Deep Web network address to be provided to or made accessible to a customer computer for subsequent viewing.

According to an embodiment, a method for preparing a personalized quote or proposal includes receiving, from a user, a selection of items for a quote or proposal for a customer; determining the customer identity and/or the user identity; selecting at least a content element or a template element for the proposal responsive to the customer identity and/or the user identity; and displaying the proposal including the selected content element and/or the selected template element.

According to an embodiment a method for presenting a quote or proposal to a customer includes receiving, selecting, or generating a network address for displaying a quote or proposal to a selected customer; receiving or determining a customer identity corresponding to a customer communication address to which the network address is transmitted; and displaying the quote or proposal including at least one content, item, or format element that is selected responsive to the customer identity.

According to an embodiment, a method for receiving a customer response to a quote or proposal may include displaying, at a particular network address, a quote or proposal including one or more graphical customer interface objects for receiving input from a customer; receiving input from the customer using at least one of the graphical customer interface objects; and reporting, to a user, a status of the quote or proposal corresponding to the received input from the customer.

According to an embodiment, a method for preparing a quote or proposal includes receiving data corresponding to a quote or proposal; receiving or determining a user or a user organization corresponding to the person that input the data corresponding to the quote or proposal; receiving or determining at least one rule related to content, format, or price corresponding to the user or user organization; and applying the at least one rule to produce a quote or proposal that is compliant with the rule.

According to an embodiment, a method for preparing a quote or proposal includes receiving data corresponding to a quote or proposal; determining a customer or customer organization corresponding to a person or organization for whom the quote or proposal was prepared; determining at least one rule related to content, format, or price corresponding to the customer or customer organization; and applying the at least one rule to produce a quote or proposal that is compliant with the rule.

BRIEF DESCRIPTION OF THE FIGURES

FIG. 5 is another illustrative example of a quote or proposal for the same items as the quote or proposal examples of FIGS. 3 and 4, according to embodiments.

DETAILED DESCRIPTION

Figure 1A:
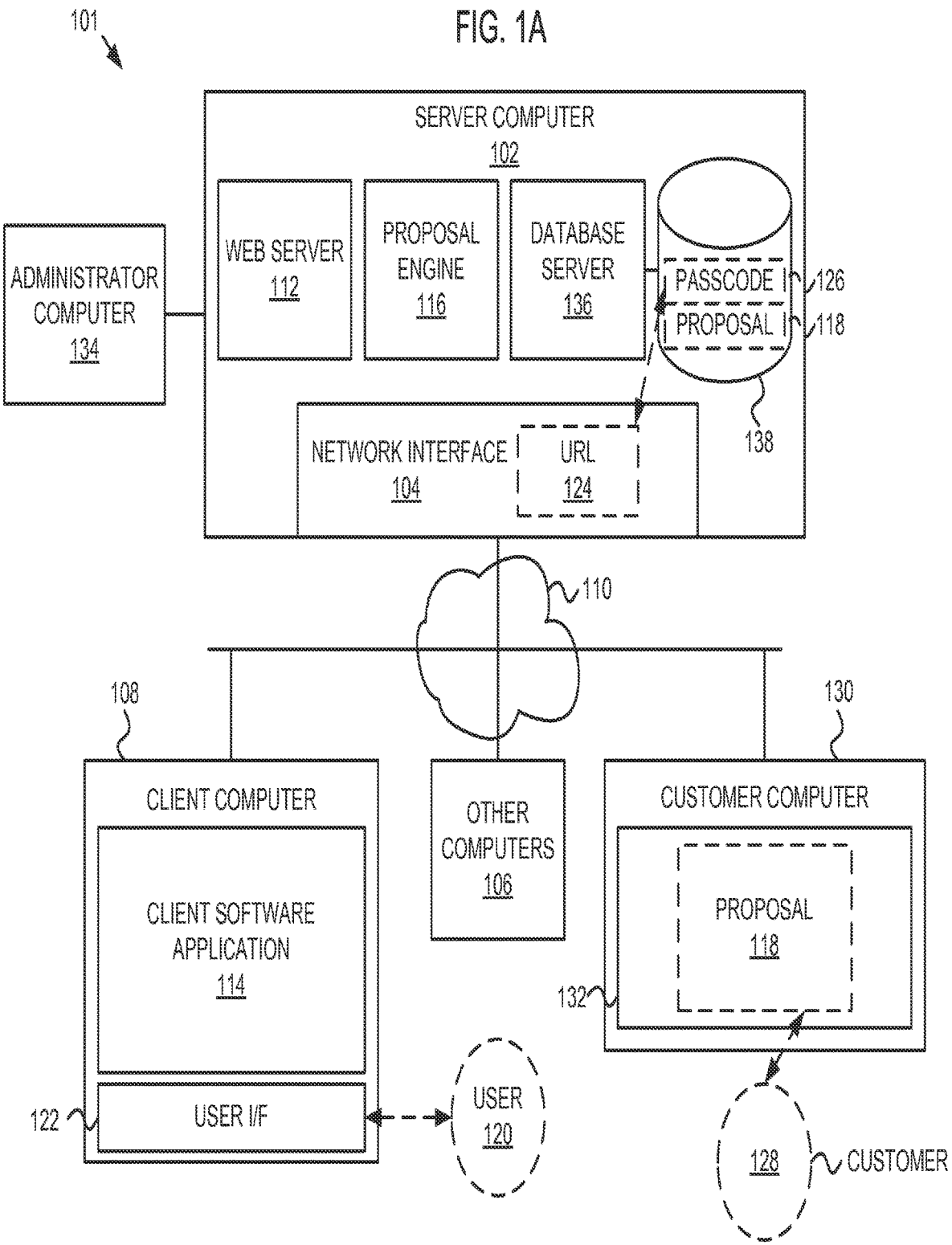
FIG. 1A is a block diagram of a system for preparing and presenting quotations and proposals, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1A is a block diagram of a system 101 for providing quotes and proposals, according to an embodiment. At least one server computer 102 includes a network communication interface 104 configured for communication with other computers 106 including a client computer 108 across a communication network 110. A web server 112 may be operatively coupled to the at least one server computer 102 and configured to interface with a client software application 114 running on the client computer 108. A proposal engine 116 may be operatively coupled to the web server 112 and the client software application 114. As shown in the depiction of FIG. 1A, the proposal engine 116 may be configured to run on the at least one server computer 102 and configured to communicate with the client software application 114 via the server computer network communication interface 104 and the network 110. For example, the proposal engine 116 may include an application that runs on an operating system of the server computer 102 and which communicates with the web server 112, which may include another application running on the operating system of the server computer 102. Alternatively, the proposal engine 116 may be configured as an application that runs on the web server 112, such as via an application programming interface (API) for the web server 112.

Figure 1B:
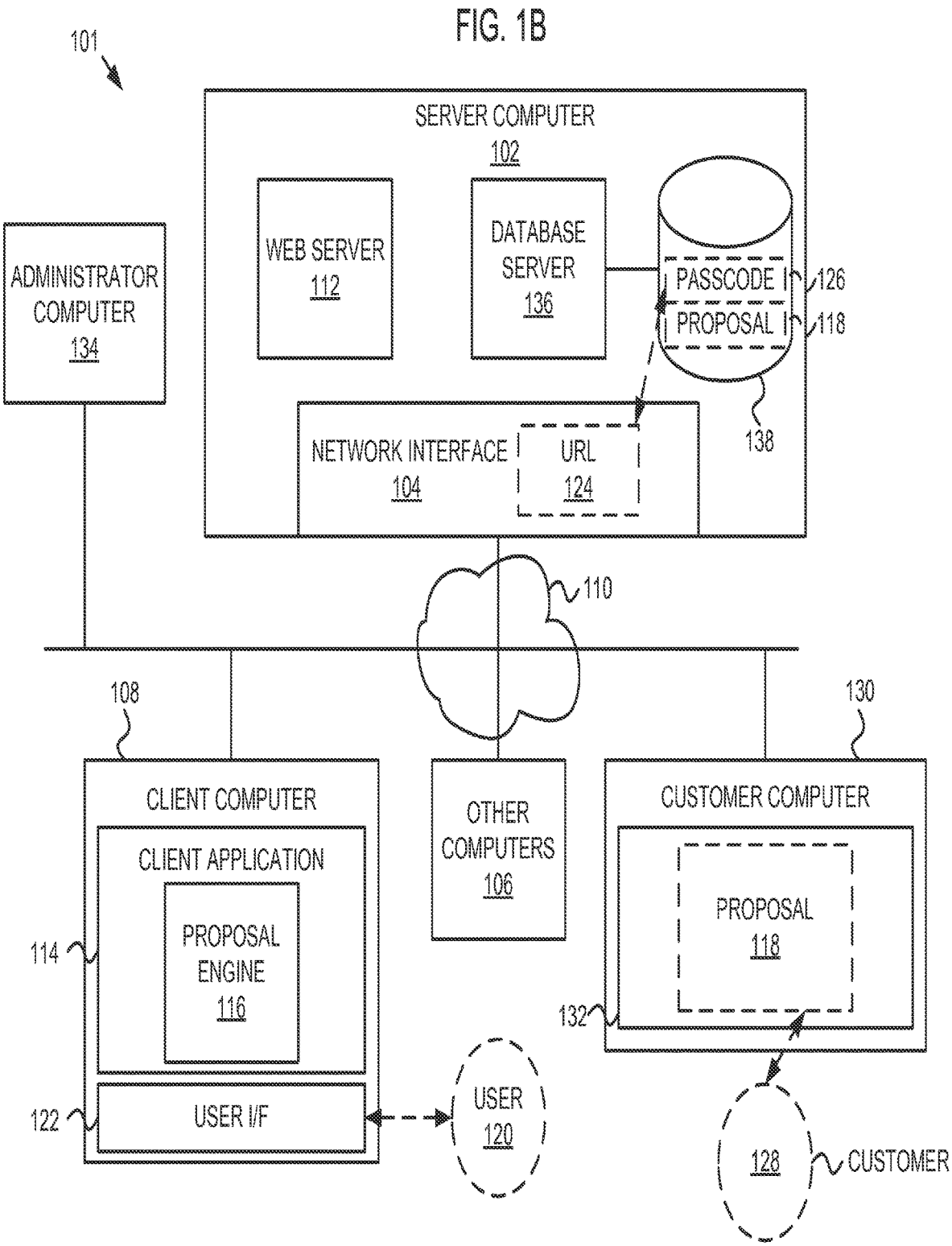
FIG. 1B is a block diagram of a system for preparing and presenting quotations and proposals, according to an embodiment.

According to another embodiment 117 depicted in FIG. 1B, the proposal engine 116 may be configured to run on the client computer 108, optionally as part of or substantially as the client software application 114. The embodiment 117 of FIG. 1B may, for example, be most appropriate when the client computer 108 is a conventional desktop or laptop computer having an operating system (not shown), local storage (not shown) and, computing resources (not shown) capable of running an application program having the capabilities of the proposal engine 116. The embodiment 101 of FIG. 1A may, for example, be most appropriate when the client computer 108 is a less capable computer such as a tablet computer or smart phone, or when the client computer 108 is capable but has an unsupported operating system (not shown). That said, computing architectures and capabilities continue to evolve, and the architectures 101, 117 respectively represented in FIGS. 1A and 1B may be substituted for one another as desired by the system architect. As presently practiced at the time of this application, both the embodiments 101 and 117 shown respectively in FIGS. 1A and 1B are operated by the applicant. Alternatively, another embodiment (not shown) may include some portions of the proposal engine 116 being resident on the server computer 102 and other portions of the proposal engine 116 being resident on the client computer 108. For the server-based proposal engine 102, 116 architecture 101 shown in FIG. 1A, the proposal engine 116 may operate on the same server computer 102 as the web server 112, or may alternatively be deployed on a different server computer 102.

The proposal engine 116 may be configured to cooperate with the client software application 114 to receive selections of items corresponding to a proposal 118 from a user 120 via a user interface 122; generate, select, or receive at least a portion of a Deep Web network address 124, 126 corresponding to the proposal 118; and cause display of the proposal 118 including the selected items for viewing at the Deep Web network address 124, 126. Typically, the user 120 is a person different than a customer 128 to whom the proposal is intended to be displayed. As will be described in greater detail below with reference to FIG. 2, the Deep Web network address may include a first portion 124 that is a surface web address, indexed by search engines. Typically, the first portion 124 of the Deep Web network address may be represented by a uniform resource locator (URL) or an Internet protocol (IP) address. While FIGS. 1A, 1B depict the first portion 124 of the network address within the server computer 102, this is for convenience and ease of understanding. The URL or IP address 124 may not physically reside within the server computer 102, but rather is a construct used by web routers for addressing the server computer 102. The second portion 126 may typically include a query term that is not indexed by search engines.

Generally speaking, the user 120 may operate as a trusted advisor for the customer 128. For example, if a customer 128 needs to purchase a computer system, the user 120 may select items such as computing equipment, cables, a printer, software, and support services intended to work together to perform the tasks needed by the customer 128, and list the items as line items in the proposal 118. According to embodiments, such goods and services may include a plurality of line items that can be presented to the customer 128 via the proposal 118 for acceptance and/or denial by the customer 128; or alternatively, for receiving feedback for subsequent modification by the user 120. Alternatively, the user 120 may select items intended to be alternatives for the customer 128. For example, the user 120 may select a laptop computer configuration and a desktop computer configuration as alternative line items (for example, where cables, a printer, and support services are included as components of each line item).

Line items may be presented in the proposal in any way the user 120 desires, according to the selection of one or more proposal template(s). For example, the proposal may include radio buttons to allow the customer 128 to select one or the other of the alternatives, may include check boxes to select items that are not mutually exclusive, or may include write-in fields to allow the customer 120 to insert comments or list additional items, etc. Items may be presented as photos or sketches in addition to or in alternative to names and/or descriptions. The selected items may additionally or alternatively include selected services or selected service providers.

Figure 3:
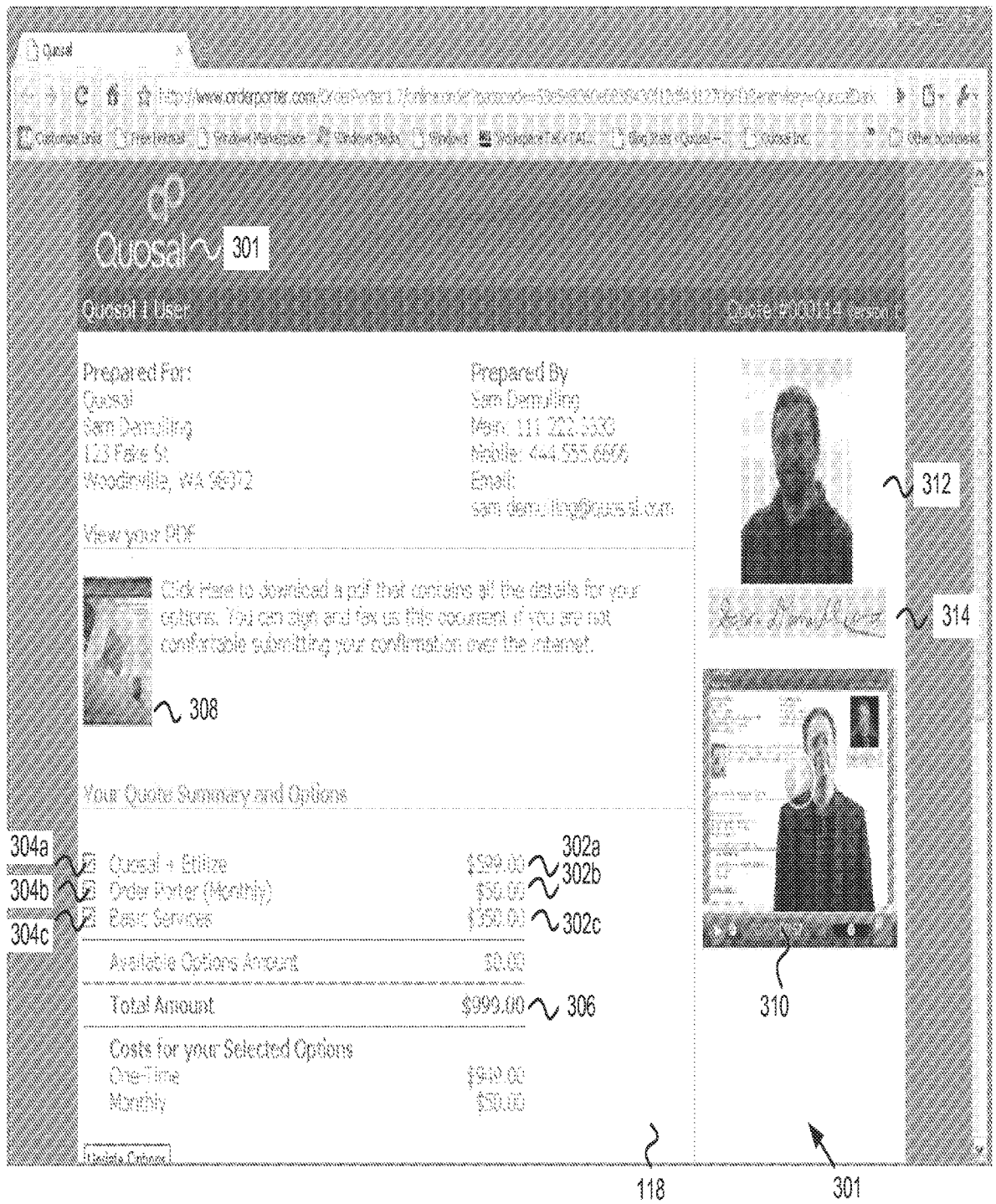
FIG. 3 is a second screenshot of a display presented by the system of FIG. 1, according to an embodiment.

An illustrative example 301 of a quote or proposal 118 as accessed by a customer is shown in FIG. 3. The quote or proposal 118 may include a plurality of line items 302a, 302b, 302c; and corresponding user input objects 304a, 304b, 304c to allow the user 128 to accept or reject individual line items. A total price 306 may dynamically change responsive to user selection of the items 302a, 302b, 302c. A link 308 to an external object such as a PDF may be provided, for example, to maintain a clean look, maximize readability, and minimize real estate occupied by the proposal 118. A video object 310 may be embedded in the proposal 118 to provide a personal presentation from the user (seller), a demonstration of the product, or other video information. A photo or image 312 of the customer or a customer logo may be included to personalize the proposal 118. A customer input field 314 may be included for various purposes, such as (in the example 301) to receive a customer signature for accepting the proposal. Various other information may include static or dynamic content. The example 301 is shown formatted according to a template that determines the depicted layout of the content.

Figure 4:
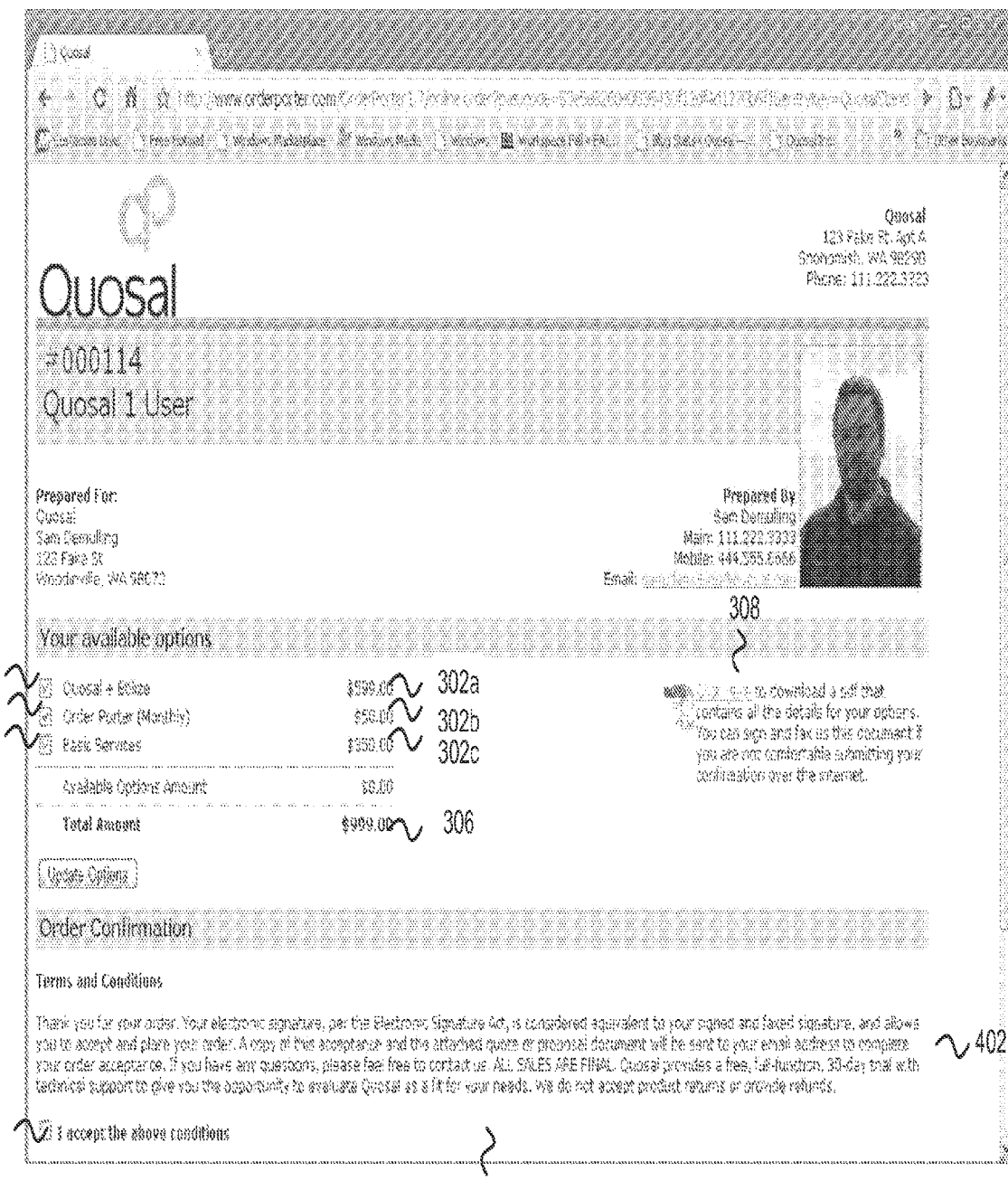
FIG. 4 is an illustrative example of a quote or proposal for the same items as the quote or proposal of FIG. 3 shown using an alternative template with some differences in content compared to the example shown in FIG. 3, according to embodiments.

FIG. 4 is an illustrative example 401 of a quote or proposal 118 for the same items as the quote or proposal 301 of FIG. 3 shown using an alternative template with some differences in content compared to the example 301, according to embodiments. The example 401 includes the same line items 302a, 302b, and 302c and corresponding selection objects 304a, 304b, 304c, the dynamic price total 306, and the link to an external object 308. In addition, the example 401 includes a listing of terms and conditions 402, and an object 404 for user acceptance of the terms and conditions. FIGS. 3 and 4 illustrate a small range of options representing user choices regarding proposal content and proposal template or format.

Figure 5:
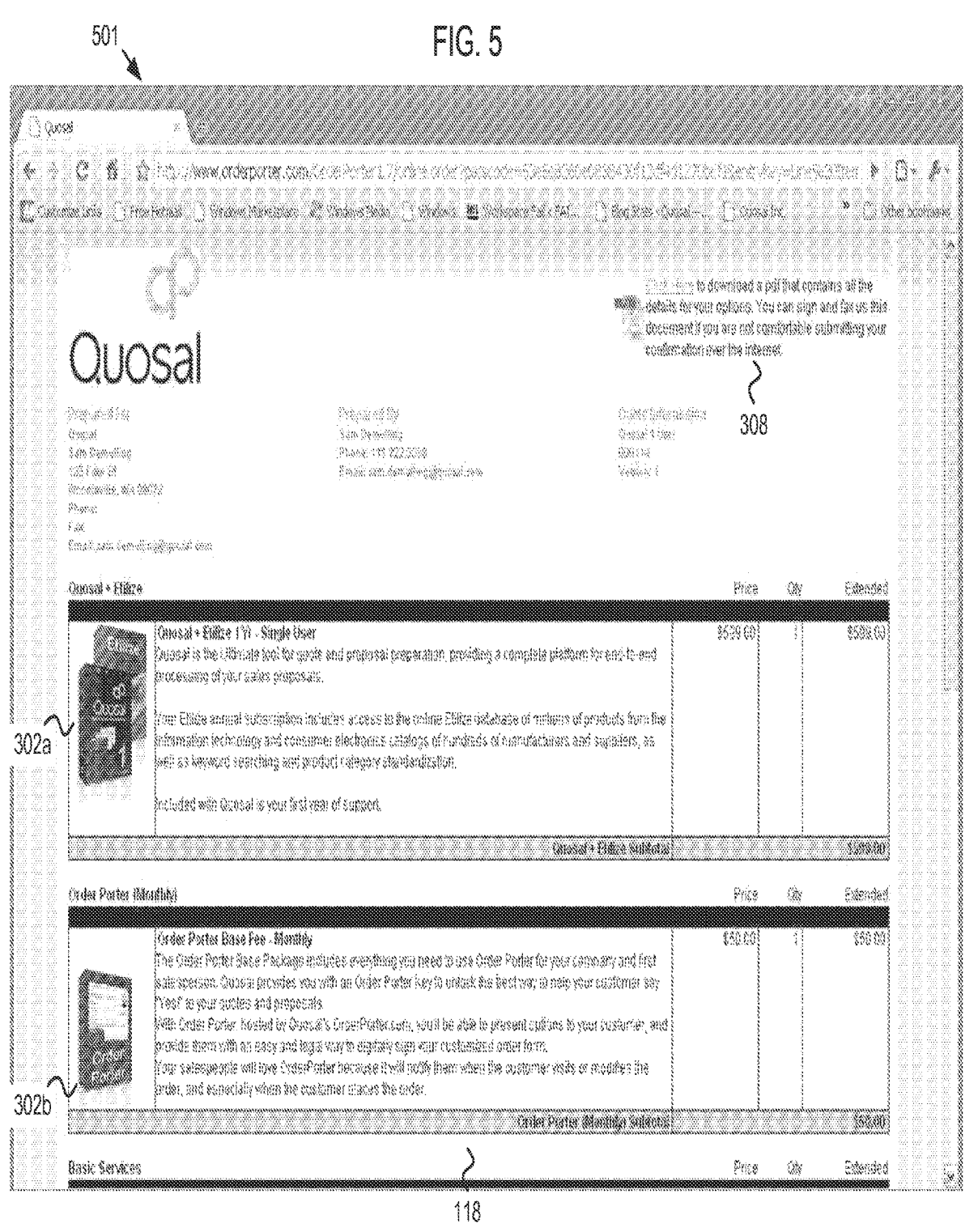

FIG. 5 is another illustrative example 501 of a quote or proposal 118 for the same items as the quote or proposal examples 301, 401 of FIGS. 3 and 4, according to embodiments. The illustrative example 501 shows the first two line items 302a, 302b presented in a different way and the link 308 to an external object. The quote or proposal example 501 is an example of a format or template that may be more appropriate for a customer device 130 (FIGS. 1A, 1B) having a larger screen 132. The quote or proposal example 401 of FIG. 4 is an example of a format or template that may be more appropriate for a customer device 130 having a smaller screen 132. The quote or proposal example 301 of FIG. 3 is an example of a format or template that may be more appropriate for a customer device 130 having a higher bandwidth connection to the communication network 110 (because of the video object 310).

Optionally, a quote or proposal 118 may be designed for review and/or approval by a plurality of customers 128. For example, acceptance of the quote or proposal may require acceptance or approval by two or more parties 128. For instances when the same quote or proposal 118 (e.g., at the same Deep Web network address) will receive review and input from two or more parties 128, the quote or proposal 118 may include customer input objects 304, 314, 404 for each of the two or more parties 128.

One aspect that is important to some embodiments is the ability of a user 120 who is not a sophisticated user of presentation software to have complete control over both content (e.g., selected items, descriptions, price, and/or additional commentary) and presentation format (e.g., template including design language, placement of fields, inclusion of customer controls, etc.) of the quote or proposal. A provider of the proposal engine 116 may, for example, provide optional design languages, elements, and controls. Alternatively, the user 120 or a third party may provide content or format options for selection by the user 120. Alternatively, a business may provide to its employees (who act as users 120) a fixed presentation template and fixed or restricted items for selection.

The template creation and control aspects offered according to embodiments includes aspects not available in pre-formatting offered with general purpose software such as word processors, spreadsheets, and presentation software. Content and format from such general purpose application software may be imported or otherwise established as template or content elements. However, template creation and selection used by the proposal engine 116 is specific to quotes and proposals. For example, as shown above, a text-based portion of a template may be based on database elements that provide calculation of a value in a field (e.g., a dynamically calculated price that is responsive to customer selection or de-selection of individual items). Moreover, a given content element may be driven from database-stored attributes of the particular customer for whom the quote or proposal is prepared. For example, a given customer (or customer's employer) may have negotiated terms and conditions that are non-standard. By identifying the customer, the proposal engine may automatically insert terms and conditions content that is specific to the given customer. According to another example, a particular customer may have a requirement to present line items in a certain way, such as to include the customer part number. According to an embodiment, the proposal engine may automatically insert an extra field corresponding to the customer part number in line item listings for quotes or proposals created for that customer. Similarly, a given sales person (user) may have a preference for inserting particular content into his/her quotes and proposals, such as a personal message, for example. By knowing the identity of the user, the proposal engine may automatically prompt the user for a personal message and/or insert a standard personal message, optionally by combining data elements such as a customer name, one or more previously inserted messages, and/or other proposal content. The range of options and capabilities of embodiments may provide a range of capabilities not previously available to users 120 and businesses for presenting web-based quotes and proposals to customers 128.

Figure 6:
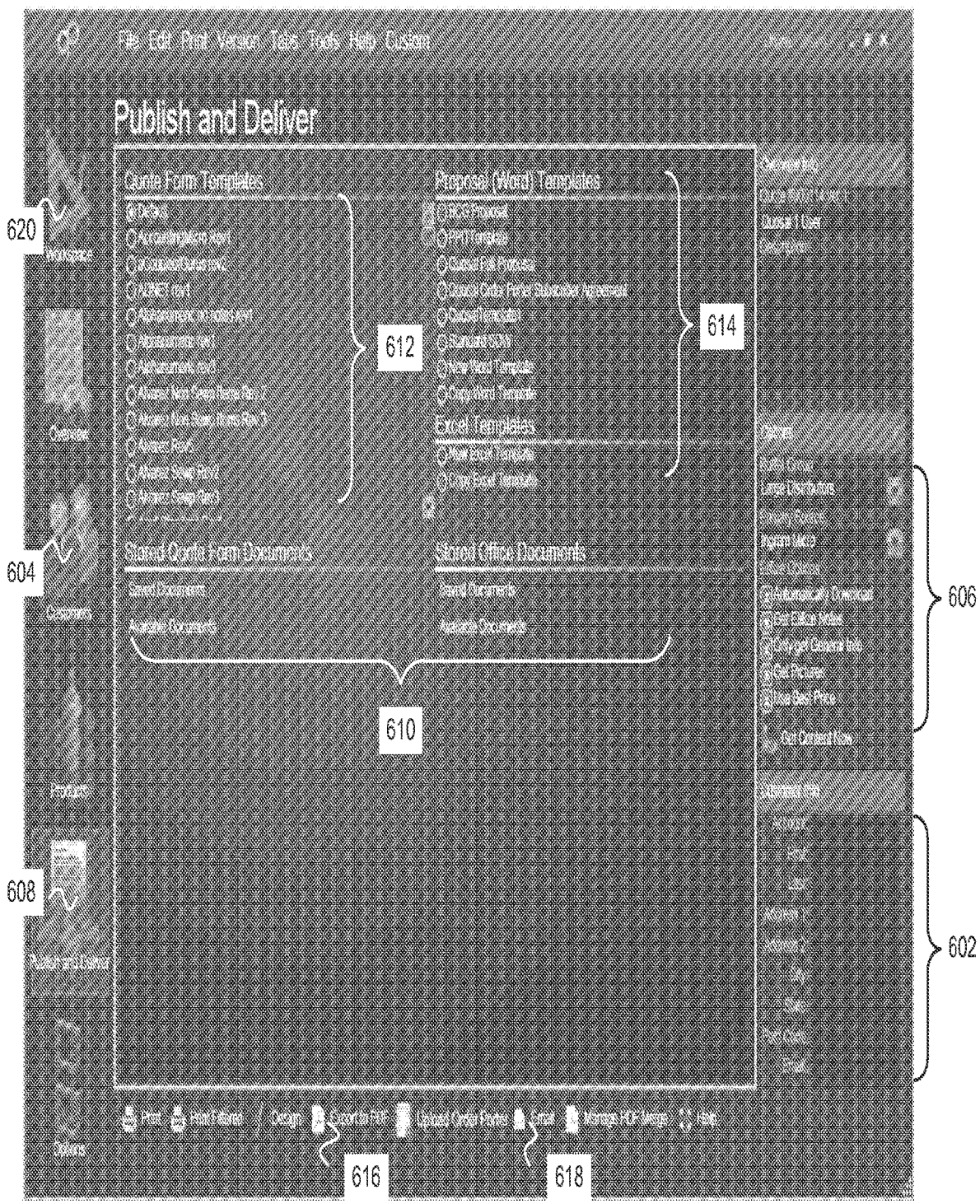
FIG. 6 is an example of a proposal content and template entry screen that may be presented to the user by the proposal engine, according to embodiments.

FIG. 6 is an example of a proposal content and template entry screen 601 that may be presented to the user 120 by the proposal engine 116, according to embodiments. A customer information input pane 602 allows the user to input information about one or more specific customers 128 for whom the quote or proposal is prepared. Previously entered customer information may be accessed by selecting a customer's icon 604. An options pane 606 may be used to select sources for items which may be selected. For example, the user 120 may select items from stored content or from vendor resources. Lists of items for selection may be accessed via a Products icon 608. A stored documents pane 610 may allow the user to select sources for content for insertion into a proposal. Such data source may include previously saved proposals or standard proposals, or may include documents prepared in another application such as a word processor or a spreadsheet. Templates may be selected from standard or previously designed quote form templates 612, or may be selected from templates 614 generated by another application such as a word processor or a spreadsheet.

Other objects may include a control 616 for exporting the quote or proposal to a PDF document, an email access icon 618 for generating an email to send a network address for accessing the quote to the customer 128, and a workspace access icon 620, which can pull up a graphical design application or a graphical design engine for designing a new template.

Referring again to FIGS. 1A and 1B, the proposal engine 116 may be further configured to provide an item selection interface (not shown) for receiving the selections of items from the user 120. Additionally, the proposal engine 116 may be configured to provide a template selection interface for receiving layout and design language selections from the user 120.

Various approaches may be used to provide a network address to the customer 128 where the proposal may be viewed. According to embodiments, the network address for viewing may include a network address that requires login and password credentials to access the quote or proposal. However, it has been found that customers 128 may be resistant to providing such access credentials. Another approach for providing a non-public quote or proposal for viewing by a customer 128 is to display the quote or proposal at a Deep Web network address that does not require login and password credentials. This approach has been found to result in higher rates of access by customers 128. Generally speaking, a Deep Web network address is a network location that cannot be or is impractical to be indexed by web search engines. Since many quotes or proposals include sensitive information and cannot or should not be made available to search engines, the use of a Deep Web network address is a good solution because it overcomes customer 128 resistance to presenting login credentials.

To use a Deep Web network address, the Deep Web network address is provided to a customer computer 130 (which may include a conventional computer, or may be a smart phone, tablet computer, or other network-connected device). As long as the customer 128 chooses to keep the Deep Web network address private, the proposal may remain private. Alternatively, the customer 128 may choose to share the Deep Web network address, and the quote or proposal may then be accessed by a larger number (and potentially a very large number) of viewers. Such additional viewers may also be regarded as customers 128.

Substantially, any method that does not expose the Deep Web network address to indexing by search engines may be used to provide the Deep Web network address to the customer 128. For example, the proposal engine 116 may be configured to transmit the Deep Web network address to the client software application 114 and/or may generate the Deep Web network address from within the client software application 114 (e.g., when the client software application 114 includes the proposal engine 116). The proposal engine 116 may additionally or alternatively be configured to cooperate with an email client (not shown) to transmit the Deep Web network address to the client computer 108 and/or to the customer computer 130.

According to an embodiment, the client software application 114 (which may include the proposal engine 116) as shown in the architecture 117 of FIG. 1B may be configured to transmit at least a portion of the Deep Web network address to the server computer 102. Alternatively, as described above, the client software application 114 may additionally or alternatively include a web browser, and the proposal engine 116 may be configured to run on the server computer 102.

The proposal engine 116 may be further configured to receive or generate at least a portion of a customer communication address, and transmit the Deep Web network address to the customer communication address. Additionally or alternatively, the client software application 114 may be configured to receive a customer communication address and transmit the Deep Web network address to the customer communication address. Optionally, the client software application 114 may be configured to cooperate with an email client (not shown) to receive a customer communication address and transmit the Deep Web network address to the customer communication address. For example, the client software application 114 may launch an email application such as a web-based email client, Microsoft Outlook®, etc., and pass the customer communication address, an email template, email content, and/or the Deep Web network address to the email application. The proposal engine may be configured to generate message content for transmitting the Deep Web network address to a customer communication address. For example, the proposal engine 116 may be further configured to launch an email client and pass the message content to the email client.

Optionally, the customer communication address may include plural customer communication addresses. The customer computer 130 may include a plurality of customer computers and/or the customer 128 may include a plurality of customers. One reason for transmitting the Deep Web network address to more than one customer computer 130 and/or more than one customer 128 may be when a quote or proposal 118 needs to be reviewed by two or more partners who need to reach consensus or majority vote to accept the quote or proposal 118. Another reason for transmitting the Deep Web network address to more than one customer computer 130 and/or more than one customer 128 may be when the quote or proposal is prepared for one person 128, but the quote or proposal must also be approved by the manager or supervisor of the person 128.

Figure 2:
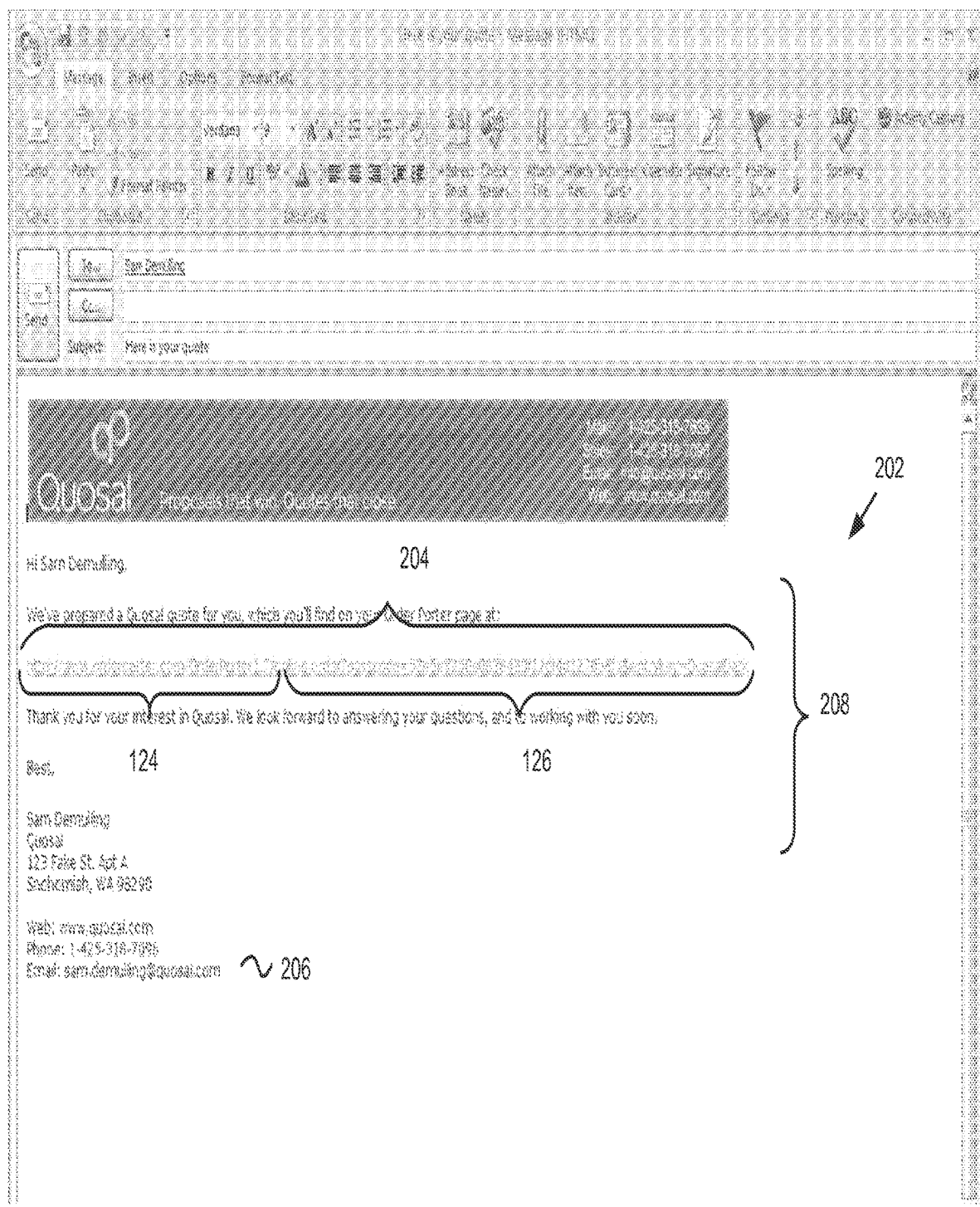
FIG. 2 is a first screenshot of a display presented by the system of FIG. 1, according to an embodiment.

FIG. 2 is a screen shot of an illustrative formatted email message 202 that may be presented to (and optionally modified by) a user 120 for transmission to the customer 128 at the customer communication address 206, according to embodiments. The email message 202 may include arbitrary content 208 including the Deep Web network address 204. Optionally, when messages 202 (or alternatively text messages or other communication modes) are sent to a plurality of customer communication addresses, each message may include the same Deep Web network address 204, or each customer 128 may be sent a different Deep Web network address. The customer 128 may access the proposal (examples of which are shown in FIGS. 3-5) by simply clicking on the link 204. As indicated above, this approach has been found to result in a higher probability of customer 128 access to the proposal 118 than approaches that require login credentials. Optionally, a plurality of Deep Web network addresses 204 may be sent to a customer 128. In one example, each of the plurality of Deep Web network addresses may represent a substantially identical selection of items, but be presented according to a template optimized for a different customer computer 130 property, such as a different screen size or resolution, communication bandwidth, etc. In another example, each of the plurality of Deep Web network addresses may represent different quotes or proposals, with different selections of items.

According to embodiments, the customer communication address may include an email address or a text message address.

Referring again to FIGS. 1A, 1B, the server computer 102 network communication interface 104 may be further configured for communication with a customer computer 130 across a communication network 110. The server computer 102 may be further configured to display the proposal 118 including the selections of items to the customer computer 130 when the customer computer 130 accesses the Deep Web network address 124, 126. The proposal engine 116 may be further configured to pick a template for displaying the proposal 118 at the Deep Web network address 124, 126. Accordingly, displaying the proposal 118 including the selected items for viewing at the Deep Web network address 124, 126 may include displaying the proposal 118 including the selected items in a format corresponding to the template.

Optionally, the web server 112 may be further configured to determine a display 132 characteristic corresponding to a customer device 130 that accesses the Deep Web network address 124, 126. Picking the template may include picking a template appropriate for the display 132 characteristic. For example, if the customer device 130 is a smart phone, a template that arranges items and/or abbreviates or omits content for viewing on a small display 132 may be selected. A larger template and/or more content may alternatively be selected for a customer device 130 that includes a large display screen 132. Determining a display characteristic may, for example, include issuing a call to a .net WebRequest.Header property. Optionally, the proposal engine 116 may be configured to receive a preferred language of the customer 128 from the client software application 114, and the proposal engine 116 may be further configured to pick the template for displaying the proposal 118 at the Deep Web network address 124, 126 to correspond to the preferred language of the customer 128.

The proposal engine 116 may be configured to receive a template design or a template selection. Displaying the proposal 118 including the selected items for viewing at the Deep Web network address 124, 126 may include displaying the proposal including the selected items in a format corresponding to the template. For example, the proposal engine 116 may be configured to receive the template design or the template selection from the client software application 114 (and, as described above, may in fact comprise a portion of the client software application 114).

The system 101, 117 may include an administrator computer 134 operatively coupled to the proposal engine 116. This is shown in FIG. 1A as a computer 134 directly coupled to the server computer 102. Alternatively, the administrator computer 134 may be the server computer 102. In an alternative, the administrator computer 134 may be operatively coupled to the proposal engine 116 via the network 110, as shown in FIG. 1B. While these respective configurations are shown respectively for server 102-based proposal engine 116 and a client computer 108-based proposal engine 116, the connection to the administrator computer 134 may be interchangeable in either architecture 101, 117. The proposal engine 116 may be configured to receive the template design or the template selection from the administrator computer 134.

The selections of items described above may correspond to a plurality of selected items. Displaying the proposal 118 including the selected items for viewing at the Deep Web network address 124, 126 may include displaying a plurality of line items corresponding to the plurality of selected items.

The system 101, 117 may include a database server 136 operatively coupled to the proposal engine 116 and the web server 112. The database server 134 may be configured to store one or more records including at least a portion of the Deep Web network address 126 and the proposal 118 on a non-transitory computer-readable medium 138 such as a hard disk or disk array. The database server 134 may be configured to store one or more records including at least a portion of the Deep Web network address 126, the selected items (not shown), and a template (not shown) corresponding to a format for displaying the selected items. For example, the proposal 118 stored by the database server 136 on the computer-readable medium 138 may be configured as a plurality of data fields including at least the selected items and the template.

As described above, the client software application 114 may include a browser. The web server 112 may be configured to present a HyperText Markup Language (HTML), Extensible Markup Language (XML), or HTML and XML interface to the browser 114 to convey a graphical user interface from the proposal engine 116 to a user 120 of the client computer 108 and receive the selections of items from the user 120 of the client computer 108. This arrangement may be best visualized in reference to the system architecture 101 shown in FIG. 1A. Alternatively or additionally, the client software application 114 may include a graphical user interface (GUI) module (not shown) configured to present a GUI to a user 120 of the client computer 108 and receive the input from the user 120 of the client computer 108. The client software application 114 may also include a data communication module (not shown) configured to transmit the selections to the proposal engine 116. This arrangement may be configured as either the system architecture 101 of FIG. 1A or the system architecture 117 of FIG. 1B.

Optionally, the Deep Web network address may include a plurality of Deep Web network addresses. With this arrangement, the proposal engine 116 may be configured to cooperate with the client software application 114 to cause a display of different selections of items, a display of the same selections of items using different templates, or a display of different selections of items using respective different templates at each of the plurality of Deep Web network addresses.

In some embodiments, the proposal engine 116 may be configured to generate the proposal 118 from the selected items and a proposal template substantially when a customer 128 accesses the Deep Web network address. In other embodiments, the proposal engine 116 may be configured to generate the proposal from the selected items and a proposal template prior to when a customer 128 accesses the Deep Web network address.

As described above, various media may be used to convey a Deep Web network address to a customer 128. Conveying the Deep Web network address in an email message has been found to be an effective medium. Accordingly, the system 101, 117 of FIGS. 1A, 1B may include an email server (not shown) operatively coupled to the proposal engine 116. The proposal engine 116 may be configured to pick an email template and cooperate with the email server (not shown) to prepare an email including the Deep Web network address and formatted according to the email template for transmission to a customer communication address.

Referencing FIGS. 1A, 1B, and 2, the Deep Web network address may include a first portion 124 that is indexed by and/or linked from a surface web location accessible by conventional web search engines, and a second portion 126 that is unpredictable and sufficiently long to substantially prevent systematic search. The Deep Web network address may thus be non-indexed and non-linked. The Deep Web network address may be uncrawlable. According to an embodiment, the Deep Web network address does not require registration or login. In an alternative embodiment, the Deep Web network address may be a contextual address, such as an address configured to be accessible to query by devices having a predetermined URL access history. The Deep Web network address may be generated by a JavaScript or other randomizing or pseudo-randomizing application. According to an embodiment implemented by the applicant, the Deep Web network address may include a Uniform Resource Identifier (URI) 204 including a URL 124 that is indexed and, associated with the URL, a non-indexed query 126 including a passcode that is generated by a random number or pseudo-random number generator and which provides a path to the proposal 118.

The web server 112 may be configured to display the proposal 118 as a web page at the Deep Web network address 124, 126. The proposal engine 116 may be configured to cause the proposal 118 to be displayed using a template that includes a graphical user interface (GUI) configured to receive input from a customer 128 when the proposal is accessed at the Deep Web network address 124, 126. The web server 112 (and the proposal server 116) may be further configured to receive customer 128 input including one or more requests, selections, acceptances, or purchases from the customer via the GUI at the Deep Web network address. The web server 112 may be configured to cooperate with the proposal engine 116 and the client software application 114 to provide to the user 120 the one or more, or a summary of one or more of the requests, selections, acceptances, or purchases received from the customer 128 via the GUI at the Deep Web network address 124, 126.

Figure 7:
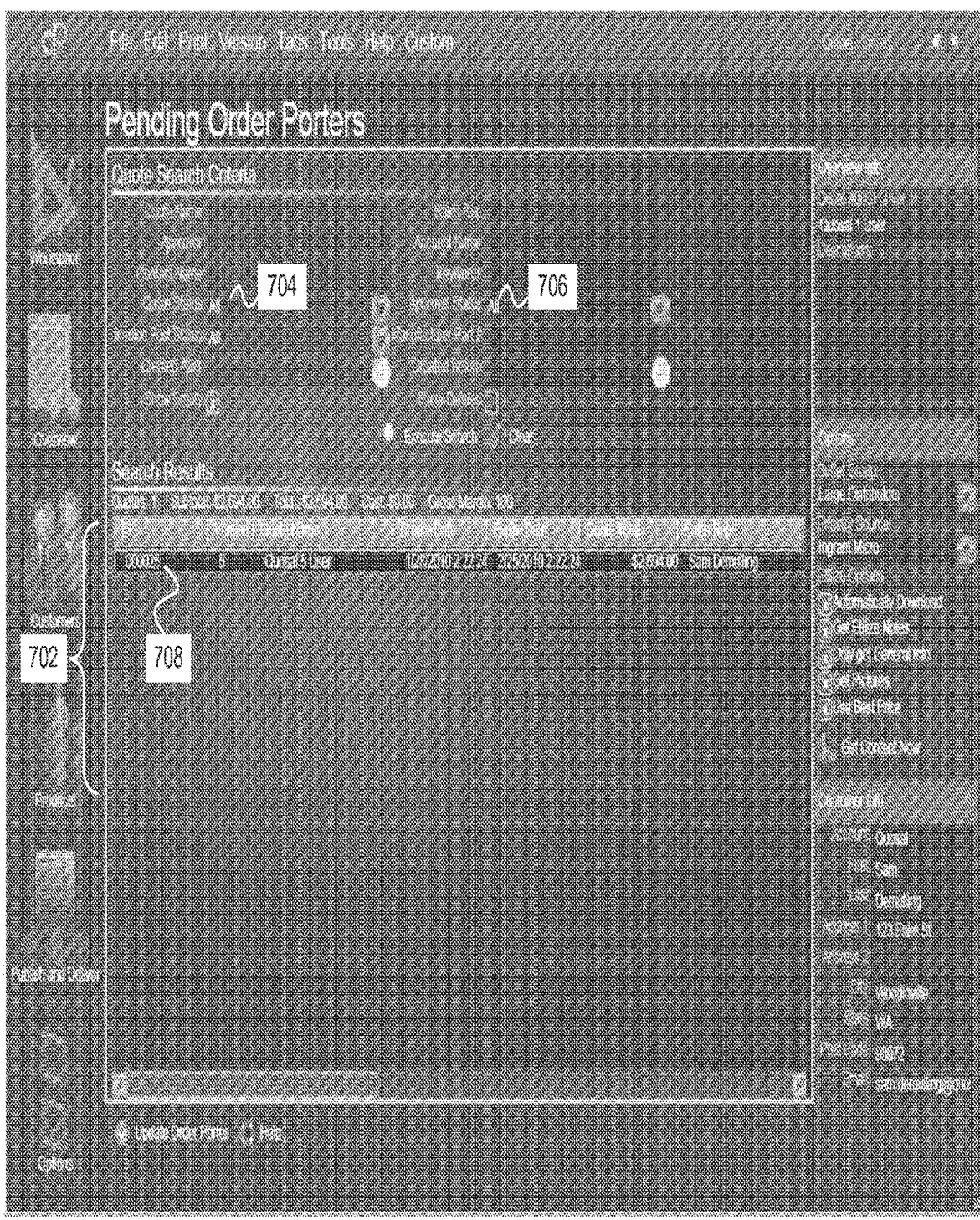
FIG. 7 is a screen shot showing an illustrative user feedback screen that can be used to inform the user of the status of quotes or proposals that have been prepared, according to embodiments.

FIG. 7 is a screen shot showing an illustrative user feedback screen 701 that can be used to inform the user 120 of the status of quotes or proposals that have been prepared, according to embodiments. The proposal status pane 702 may list a plurality of quote or proposal status. Items for listing may, for example, be selected according to a quote status selection 704, an approval status selection 706, date, invoice status, etc. More information about customer 128 response to a particular quote may be accessed by clicking on a particular item 708 in the list of quotes and proposals meeting the selected criteria.

Optionally, the proposal engine 116 may be configured to modify one or more of the selections of items, the template, or a price displayed at the Deep Web network address 124, 126 responsive to the input from the customer 128. The proposal engine 116 may be configured to display an input interface (not shown) associated with or linked from the Deep Web network address for receiving input from the customer 128 responsive to the proposal displayed at the Deep Web network address. For example, when a proposal 118 does not include objects for customer 128 input (or in addition to such objects for customer 128 input), an input interface may be provided by the proposal engine 116.

The system 101, 117 may be configured to cooperate with other resources such as electronic shopping carts, enterprise resource planning (ERP) software, scheduling software, inventory management software, order processing software, order fulfillment software, salesforce management software, etc. to manage and fulfill accepted proposals. Alternatively, the system 101, 117 may include such resources.

For example, the system 101, 117 may further include an order processing server or module (not shown) operatively coupled to the proposal engine 116. The order processing server or module (not shown) may be configured to process an order received from the customer 128 via one or more input objects displayed at the Deep Web network address or linked from the Deep Web network address. Optionally, the order processing server or module (not shown) may be configured to receive an order transmitted from the proposal engine 116 or the database server 136; or the order processing server or module (not shown) may be configured to receive the Deep Web network address 124, 126 and cooperate with the database server 136 to process an order by reading the non-transitory computer readable media 138.

According to another example, the system 101, 117 may also include an electronic shopping cart (not shown), wherein the customer 128 and/or the user 120 may process an order and/or payment for selected items for purchase. Optionally, the electronic shopping cart (not shown) may be configured to receive an order transmitted from the proposal engine 116 or the database server 136; or the electronic shopping cart (not shown) may be configured to receive the Deep Web network address 124, 126 and cooperate with the database server 136 to generate an order by reading the non-transitory computer readable media 138.

According to another example, the system 101, 117 may further include a fulfillment server (not shown) operatively coupled to the proposal engine 116. The fulfillment server (not shown) may be configured to cooperate with the proposal engine 116 to transmit or display one or more items in a pick list (not shown) to fulfill an order received from the customer 128 responsive to the proposal 118. Optionally, the fulfillment server (not shown) may be configured to receive a pick list transmitted from the proposal engine 116 or the database server 136; or the fulfillment server (not shown) may be configured to receive the Deep Web network address 124, 126 and cooperate with the database server 136 to generate a pick list by reading the non-transitory computer readable media 138.

The web server 112, client software application 114, proposal engine 116, database server 136, as well as the order processing server (not shown) and fulfillment server (not shown) may each be embodied as software programs or modules comprised of computer-executable commands stored on non-transitory computer-readable media. The client software application 114 (optionally including the proposal engine 116) may exist on a computer readable medium on the server computer 102 prior to download to the client computer 108. Alternatively, the client software application 144 may be delivered to the client computer 108 as one or more optical disks, solid state memory, or the like that may be loaded onto the client computer 108 by the user 120 or an administrator or technician (not shown). After loading, client software application 114 (optionally including the proposal engine 116) may then be embodied as computer-executable commands stored on non-transitory computer-readable media within or operatively coupled to the client computer 108.

Some of the functionality described herein refers to transmitting or receiving a Deep Web network address. Transmitting or receiving a portion of the Deep Web network address may be considered equivalent to transmitting or receiving the entire Deep Web network address. For example, for operatively coupled processes that reside within the web server, it may be unnecessary to specify the URL of the server. Instead, only all or a portion of the passcode may be transmitted or received, because the URL is implied or not accessed.

Figure 8:
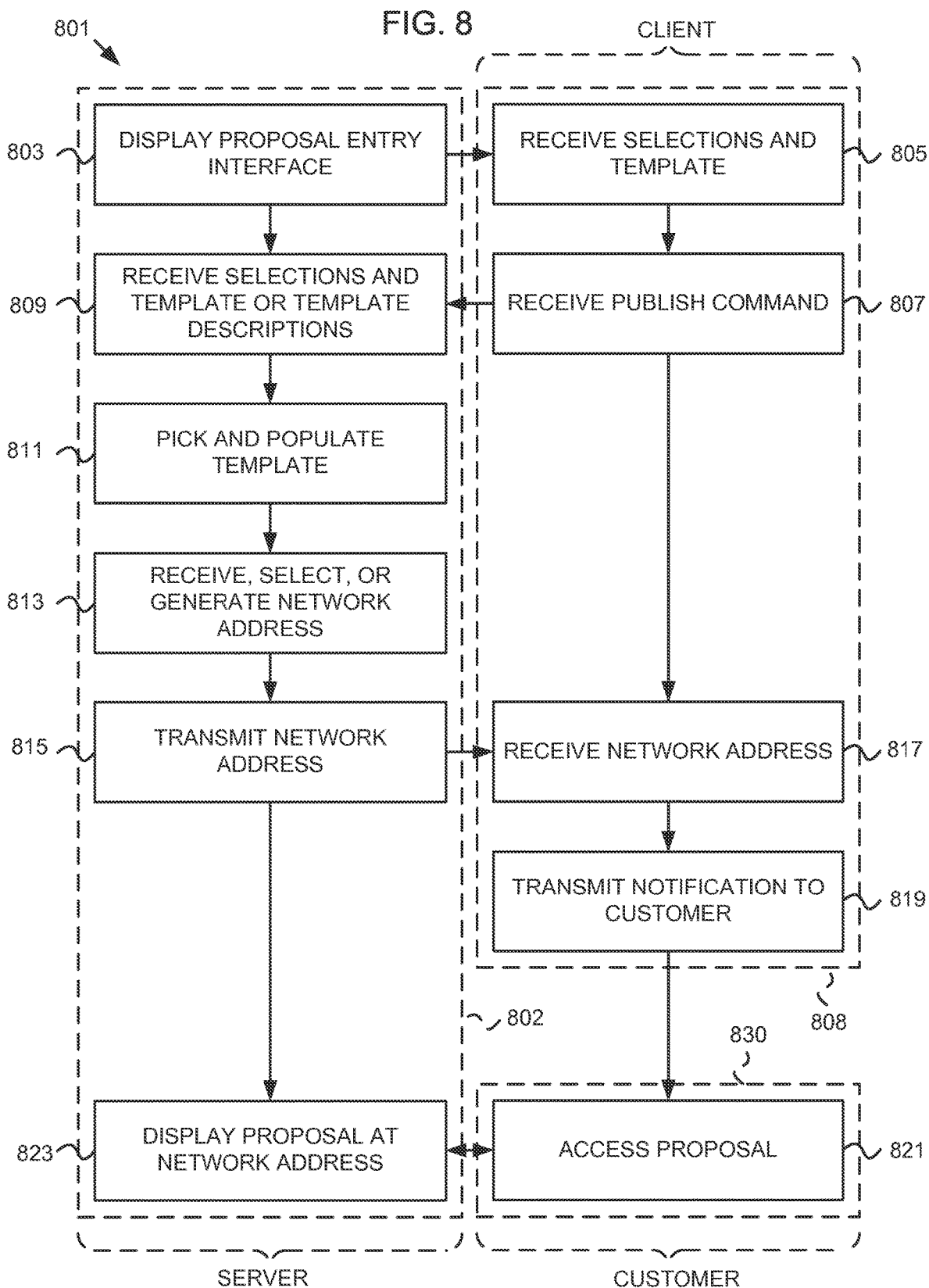
FIG. 8 is a flowchart showing actions and interactions in and between elements of the system of FIGS. 1A and 1B, according to embodiments.

FIG. 8 is a flowchart 801 showing actions and interactions in and between elements of the system 101, 117 of FIGS. 1A and 1B, according to embodiments. The organization of the flowchart 801 assumes that the system is configured as the embodiment 101 of FIG. 1A, with the proposal engine 116 being resident on the server computer 102. A first portion 202 of the flowchart steps 801 may be performed by a server computer 102. A second portion of the flowchart steps 808 may be performed by a client computer or device 108. A third portion of the flowchart steps 830 may be performed by the customer computer or device 130.

Beginning at step 803, the server computer process 802 displays a proposal entry interface on the client computer or device process 808. Proceeding to step 805, the client software application receives selections from the user. The selections received in step 805 may include selections of items, selection or design of a template or template elements, and optionally selection of other content for the proposal. Once a user is satisfied with the proposal, the method 801 may proceed to step 807, where a publish command is received from the user.

Upon receipt of the publish command, the process 801 proceeds to step 809, which may occur in the server computer process 802. In step 809, the server computer and the proposal engine (see 116, FIG. 1A) receive the item selections, template(s) or template designation(s), and optionally additional content. The process 801 then proceeds to step 811, wherein the proposal engine picks the template corresponding to user selection(s), and populates the template(s) with the selected items, and optionally with the additional content. Step 811 may be completely responsive to user selections received in step 805 or may also be responsive to selections made by a system administrator, company management of the user, or another party. For example, the user may provide preferences for how the proposal should be presented, and the proposal engine may perform step 811 based at least in part on the user preferences.

The process then proceeds to step 813 (which need not occur after step 811) where a network address or a portion of the network address for display of the proposal is generated. For example, the network address may be a Deep Web network address as described above. Optionally, the network address may be a surface web network address, and step 813 may also include receiving selecting or generating a user login and password. Proceeding to step 815, the server computer process 802 may transmit the address generated in step 813 (and/or the user login and password) to the client device process 808, which receives the network address in step 817. For example, step 815 may include launching an email application, passing the network address and customer communication address to the email application, and optionally passing an email template (which may correspond to the proposal template) to the email application. Step 817 may include opening an email client and receiving the formatted email message including the network address. As described above, the customer communication address may include a plurality of customer communication addresses (and optionally, multiple communication modalities), and the network address may include a plurality of network addresses.

Proceeding to step 819, the client computer process 808 may receive a command from the user to transmit notification of the proposal availability to a customer computer 830, and a client software application may execute the command. Proceeding to step 821, which occurs on the customer computer or other customer device as a customer computer process 830, the customer may access the proposal at the specified network address. Responsive to access by the customer, the process 802 on the server computer proceeds to step 823, wherein the quote or proposal is displayed on the customer device. Step 823 may also include receiving input from the customer process 830.

According to an embodiment, step 823 may include dynamically generating new web page content responsive to input from the customer process 830. For example, as described above, a customer may select or deselect line items in a proposal, and the total price may be dynamically recalculated and displayed on the proposal. Additionally or alternatively, the web page corresponding to the proposal may include a plurality of dynamically selected static web pages. For example, the proposal may be stored to include versions corresponding to substantially all or the most probable user selections. The user input may thus be used to call an alternative static version of the proposal rather than driving a dynamic change in the proposal.

After receipt of the customer input, the process portion 802 may proceed to another step (not shown) wherein the user input or a summary of user input is transmitted to the client computer process 808 for display to the user. The process 801 may optionally loop back to step 803, and proceed to allow the user to modify the proposal responsive to the user input.

Figure 9:
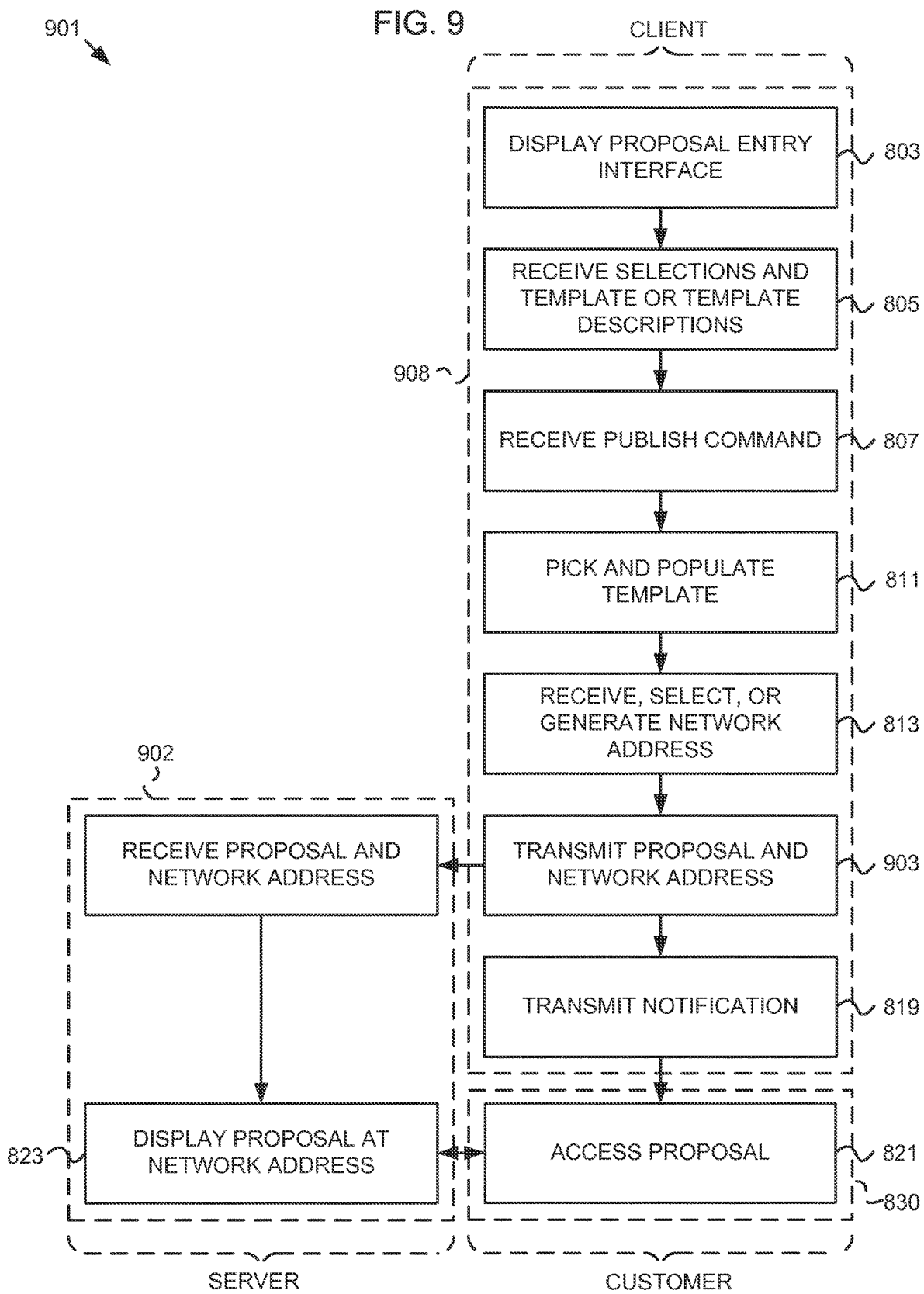
FIG. 9 is a flowchart showing actions and interactions in and between elements of the system of FIGS. 1A and 1B, according to embodiments.

FIG. 9 is a flowchart 901 showing actions and interactions in and between elements of the system 101, 117 of FIGS. 1A and 1B, according to embodiments. The organization of the flowchart 901 assumes that the system is configured as the embodiment 117 of FIG. 1B, with the proposal engine 116 being resident on the client computer 108. A first portion 902 of the flowchart steps 801 may be performed by a server computer 102. A second portion 908 of the flowchart steps 901 may be performed by a client computer or device 108. A third portion 830 of the flowchart steps 901 may be performed by the customer computer or device 130.

Beginning at step 803, the client computer process 908 displays a proposal entry interface on the client computer or device. Proceeding to step 805, the client software application receives selections from the user. The selections received in step 805 may include selections of items, selection or design of a template or template elements, and optionally, selection of other content for the proposal. Once a user is satisfied with the proposal, the method 901 may proceed to step 807, where a publish command is received from the user.

Upon receipt of the publish command, the process 901 proceeds to step 811. In step 811, the proposal engine (see 116, FIG. 1B) picks the template corresponding to user selection(s), and populates the template(s) with the selected items, and optionally with the additional content. Step 811 may be completely responsive to user selections received in step 805 or may also be responsive to selections made by a system administrator, company management of the user, or another party. For example, the user may provide preferences for how the proposal should be presented, and the proposal engine may perform step 811 based at least in part on the user preferences.

The process then proceeds to step 813 (which need not occur after step 811) where a network address or a portion of the network address for display of the proposal is generated. For example, the network address may be a Deep Web network address as described above. Optionally, the network address may be a surface web network address, and step 813 may also include receiving selecting or generating a user login and password.

Proceeding to step 903, the client process 908 transmits the proposal and the network address to a server process 902 that operates on the server computer (see 102, FIG. 1B). For example, the proposal may be transmitted as a formatted proposal; the proposal may be transmitted as data corresponding to the collection of items, template, and optional additional content received in step 805; or the proposal may be transmitted as a display list corresponding to the formatted proposal.

Following step 903, the process portion 908 may proceed to step 819, wherein the client computer process 808 may receive a command from the user or may automatically execute a command to transmit notification of the proposal availability to a customer computer 830. For example, step 819 may include launching an email application, passing the network address and customer communication address to the email application, and optionally passing an email template (which may correspond to the proposal template) to the email application. Step 819 may include opening an email client and receiving the formatted email message including the network address. As described above, the customer communication address may include a plurality of customer communication addresses (and optionally, multiple communication modalities), and the network address may include a plurality of network addresses.

Also responsive to step 903, the server computer process 902 receives the proposal and the network address from the client process 908.

Proceeding to step 821, which occurs on the customer computer or other customer device as a customer computer process 830, the customer may access the proposal at the specified network address received after the notification transmission in step 819.

Responsive to access by the customer, the process 902 on the server computer proceeds to step 823, wherein the quote or proposal is displayed on the customer device. Step 823 may also include receiving input from the customer process 830. After receipt of the customer input, the process portion 902 may proceed to another step (not shown) wherein the user input or a summary of user input is transmitted to the client computer process 908 for display to the user. The process 901 may optionally loop back to step 803, and proceed to allow the user to modify the proposal responsive to the user input.

Figure 10:
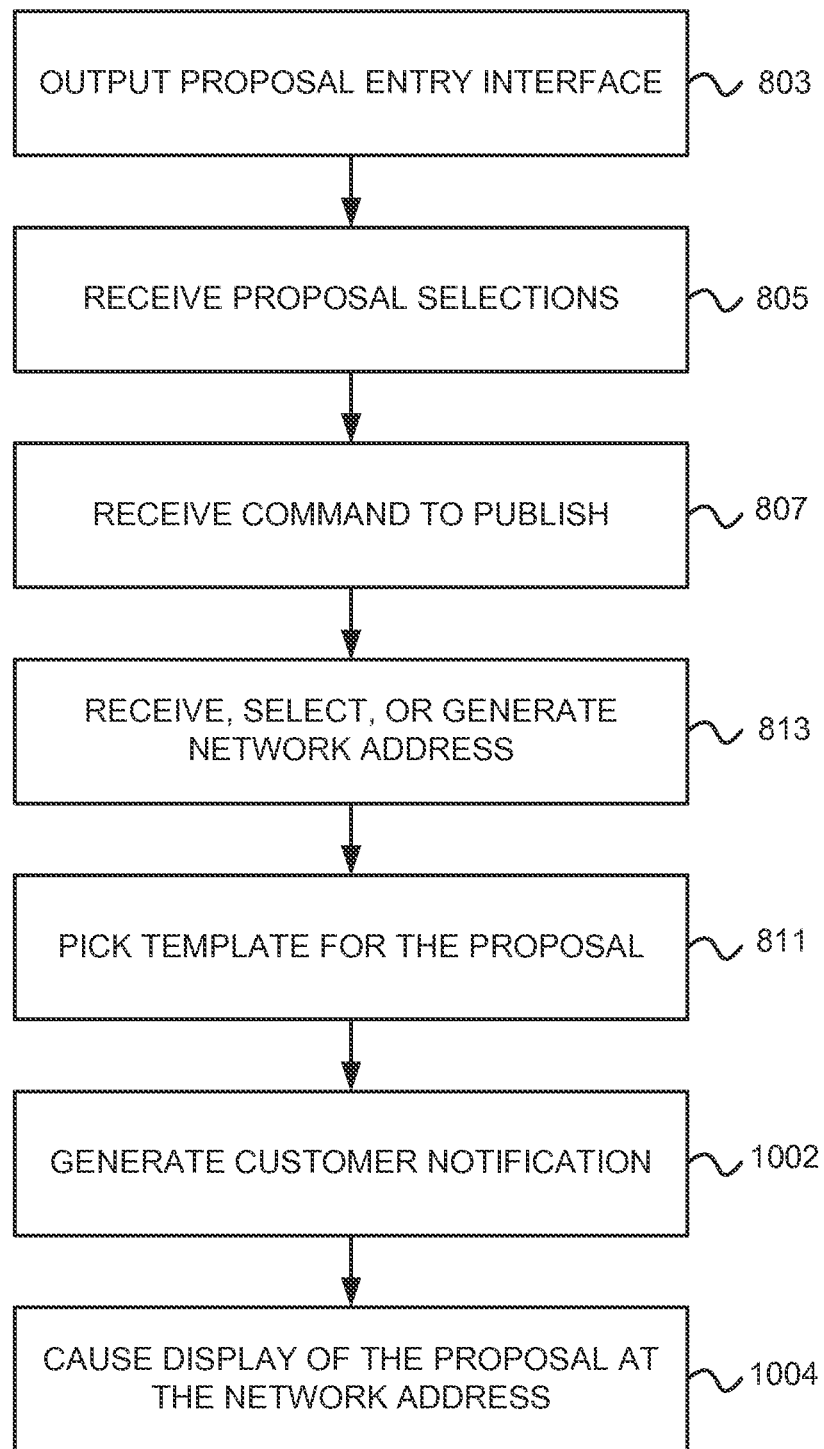
FIG. 10 is a flowchart showing a process for providing a quote or a proposal to a customer, according to embodiments.

FIG. 10 is a flowchart showing a process 1001 for providing a quote or a proposal to a customer, according to embodiments. The process 1001 may be performed by the proposal engine 116 shown in FIGS. 1A and 1B. Depending on whether the proposal engine 116 is resident on the server computer 102 (see architecture 101 of FIG. 1A) or the client computer 108 (see architecture 117 of FIG. 1B), the steps may include the described receipt of input either via the user interface 122 on the client computer 108 or via the network interface 104 of the server computer.

Beginning at step 803, a proposal entry interface may be output. Ultimately, the proposal entry interface (e.g., see the proposal entry interface 601 shown in FIG. 6) is presented to a user who may act as a trusted advisor for a customer. Providing the proposal entry interface may include providing a GUI including an item list template and item selection objects, accessing a database to retrieve at least item identifiers, and populating the item list template with at least the item identifiers. The proposal engine may be configured to receive the selection of items responsive to actuation of the item selection objects by the user.

For example, in the architecture 101 of FIG. 1A, the client software application may include a browser. Step 803 may include presenting a HTML, XML, or HTML and XML interface to the browser to convey a graphical user interface from the proposal engine to a user of the client computer and receive the selections of items from the user of the client computer.

Outputting the proposal entry interface in step 803 may include providing a GUI including an item list template and item selection objects. Optionally, a client software application (if separate from the proposal engine) may configured to access a database and populate the item list template with at least item identifiers. Optionally, the client software application may include a browser, and providing the proposal entry interface may include providing one or more web pages including at least item identifiers and item selection objects to the browser.

Optionally, providing a proposal entry interface may include transmitting a template design utility to the client software application or outputting a template design utility to the user.

Proceeding to step 805, proposal selections are received from the user. The proposal selections may include selection(s) of one or more items, selection(s) or one or more templates, and selection(s) or entry of content for the proposal. For the system architecture 101 of FIG. 1A, the selection(s) may be received into the proposal engine 116 via a network interface 104 from a client software application 114. For the system architecture 117 of FIG. 1B, the selection(s) may be received via a user interface 122 into the proposal engine 116.

Receiving the selections of items in step 805 may include receiving a plurality of item selections. The selected items may include selected services or selected service providers. Alternatively or additionally, the selected items may include selected goods intended to work together as a system or to be selected by a customer as alternatives to one another.

Proceeding to optional step 807, a command to publish may be received. For the system architecture 101 of FIG. 1A, the command to publish may be received into the proposal engine 116 via a network interface 104 from a client software application 114. For the system architecture 117 of FIG. 11B, the command to publish may be received via a user interface 122 into the proposal engine 116.

Optionally, receiving the command to publish the proposal may inherent in the selection of the items for the proposal, and may not involve receiving an explicit command.

Proceeding to step 813, a network address for display of the proposal is received, selected, or generated. For example, the network address may include a Deep Web network address. Optionally, the network address may include a plurality of network addresses.

Receiving, selecting, or generating a Deep Web network address may include receiving the Deep Web network address from another application, or generating the Deep Web network address within the proposal engine. Optionally, the Deep Web network address may be selected from a list of possible Deep Web network addresses, which may include all possible Deep Web network addresses or a small subset of possible Deep Web network addresses.

The Deep Web network address may include a first portion that is indexed by and/or linked from a surface web location accessible by conventional web search engines and a second portion that is unpredictable and sufficiently long to substantially prevent systematic search. As described above, it has been found that presenting the proposal at a Deep Web network address provides acceptable privacy and also may overcome customer resistance to logging in by presenting credentials to the web server. The Deep Web network address may be a Deep Web network address that does not require registration or login.

Typically, the Deep Web network address is non-indexed and non-linked. The Deep Web network address may be substantially uncrawlable. According to one approach, the Deep Web network address may be a contextual address. The Deep Web network address is generated by a JavaScript or other randomizing or pseudo-randomizing application.

According to an embodiment, the Deep Web network address includes a URI including a URL that is indexed, and associated with the URL, a non-indexed query including a passcode that is generated by a random number or pseudo-random number generator and which provides a path to the proposal.

Proceeding to step 811, one or more template(s) is/are picked for the presentation. Typically, the one or more template(s) may be picked responsive to the selection(s) received in step 805.

Optionally, the process 1001 may include determining a display characteristic corresponding to a customer device that accesses or might access the Deep Web network address (not shown). Picking a template for the proposal may include picking a template appropriate for the display characteristic. Optionally, determining a display characteristic may include issuing a call to obtain a .net WebRequest. Header property when the customer accesses the network address.

Optionally, the process 1001 may include receiving a preferred language of the customer from the client software application (not shown). Picking a template for the proposal in step 811 may include picking a template corresponding to the preferred language of the customer.

The process 1001 may next proceed to step 1002, wherein a customer notification is generated. Generating the customer notification may include causing a Deep Web network address to be provided to a customer communication address to enable subsequent access to the proposal by the customer. For the system architecture 101 of FIG. 1A, step 1002 may include transmitting the Deep Web network address or a portion of the Deep Web network address to the client software application. The customer notification generation may include transmitting the network address to the client software application 114 in the client computer 108 and/or cooperating with an email client or server to generate a message for transmission to the client computer 108 (for subsequent transmission to the customer computer 130 at the customer communication address). Optionally, the process 1001 may generate the customer notification for direct transmission from the proposal engine 116 to the customer computer 130 at the customer communication address. For the system architecture 117 of FIG. 1B, the customer notification generation may include generating an email, text, or other message for transmission to the customer communication address, described above.

Step 1002 may include receiving or looking up at least a portion of a customer communication address; and transmitting the Deep Web network address to the customer communication address. The customer communication address may, for example, include an email address or a text message address.

Step 1002 may include picking an email template and preparing an email message including the network address formatted according to the email template for transmission to the customer communication address. Alternatively, step 1002 may include receiving an email template or a selection of an email template from the client software application or from a user interface. For the system architecture 101 of FIG. 1A, step 1002 may include transmitting to the client software application at least a partially composed email message formatted according to the email template and including the network address for subsequent transmission to a customer. For the system architecture 117 of FIG. 1B, step 1002 may include presenting to the user at least a partially composed email message formatted according to the email template and including the network address for transmission to the customer.

Next, step 1004 includes causing a display of the proposal including the selection of proposed items at the network address. Causing the display of the proposal may include displaying the proposal as a web page at the Deep Web network address.

Causing the display of the proposal may include executing one or more steps, optionally in cooperation with the web server 112 and/or the database server 136, to display the proposal at the network address. Step 1004 need not require actions by a customer to be executed. For example, processing the proposal (or proposal elements) with a database server 136 such that the proposal could be accessed by the customer can be considered causing the display of the proposal. Causing a display of the proposal may include displaying the proposal at the Deep Web network address.

Causing the proposal to be displayed may include causing a plurality of line items corresponding to a plurality of item selections to be displayed. Optionally, causing a display of the proposal including the selection of proposed items may include causing a display of different selections of items, a display of the same selections of items using different templates, or a display of different selections of items using respective different templates at each of a plurality of network addresses.

Causing display of the proposal in step 1004 may include generating the proposal including the selected items substantially when a customer accesses the network address. Alternatively, causing display of the proposal may include generating the proposal including the selected items prior to when the customer accesses the network address.

Optionally, the method 1001 may include storing one or more records including the Deep Web network address and the proposal in a database. The method may further include storing the Deep Web network address, the selected items and a template in a database. Causing display of the proposal may include retrieving the proposal and/or the selected items and template from the database, and causing display as a web page.

Optionally, causing the display of the proposal at the network address may be performed responsive to receiving the command to publish in step 807.

According to some embodiments, causing the display of the proposal includes causing the proposal to be displayed using a template that includes a GUI configured to receive input from a customer when the proposal is accessed at the Deep Web network address. Optionally, customer input may be enabled by displaying an input interface associated with, or linked from the network address. This approach may allow the proposal itself not to include a capability of receiving customer input, while still preserving the functionality of receiving input from the customer responsive to the proposal being displayed at the Deep Web network address.

The process 1001 may further include a step (not shown) of receiving input from the customer including one or more requests, selections, acceptances, or purchases via the GUI at the network address or the linked input interface. The proposal engine may then provide to the user, or cooperate with the client software application to provide to the user, the one or more requests, selections, acceptances, or purchases received from the customer or a summary of one or more of the requests, selections, acceptances, or purchases received from the customer via the GUI at the network address or the linked input interface.

Optionally, the method 1001 may include (not shown) modifying one or more of the selections of items, the template, or a price displayed at the network address responsive to the input from the customer.

Optionally, the process 1001 may include storing one or more template designs (not shown). Step 805 may include receiving at template selection from a client software application or the user, and picking the template in step 811 may include picking a stored template design responsive, at least in part, to the template selection. Optionally, the process 1001 may include receiving one or more template designs from an administrator computer (not shown).

Optionally, the process 1001 may include the step (not shown) of processing an order received from a customer via one or more input objects displayed at the network address or linked from the Deep Web network address.

Optionally, the process 1001 may include the step (not shown) of operating an electronic shopping cart to receive orders from a customer.

Optionally, the process 1001 may include the step (not shown) of transmitting or displaying one or more items in a pick list to fulfill an order received from a customer responsive to the proposal.

Figure 11:
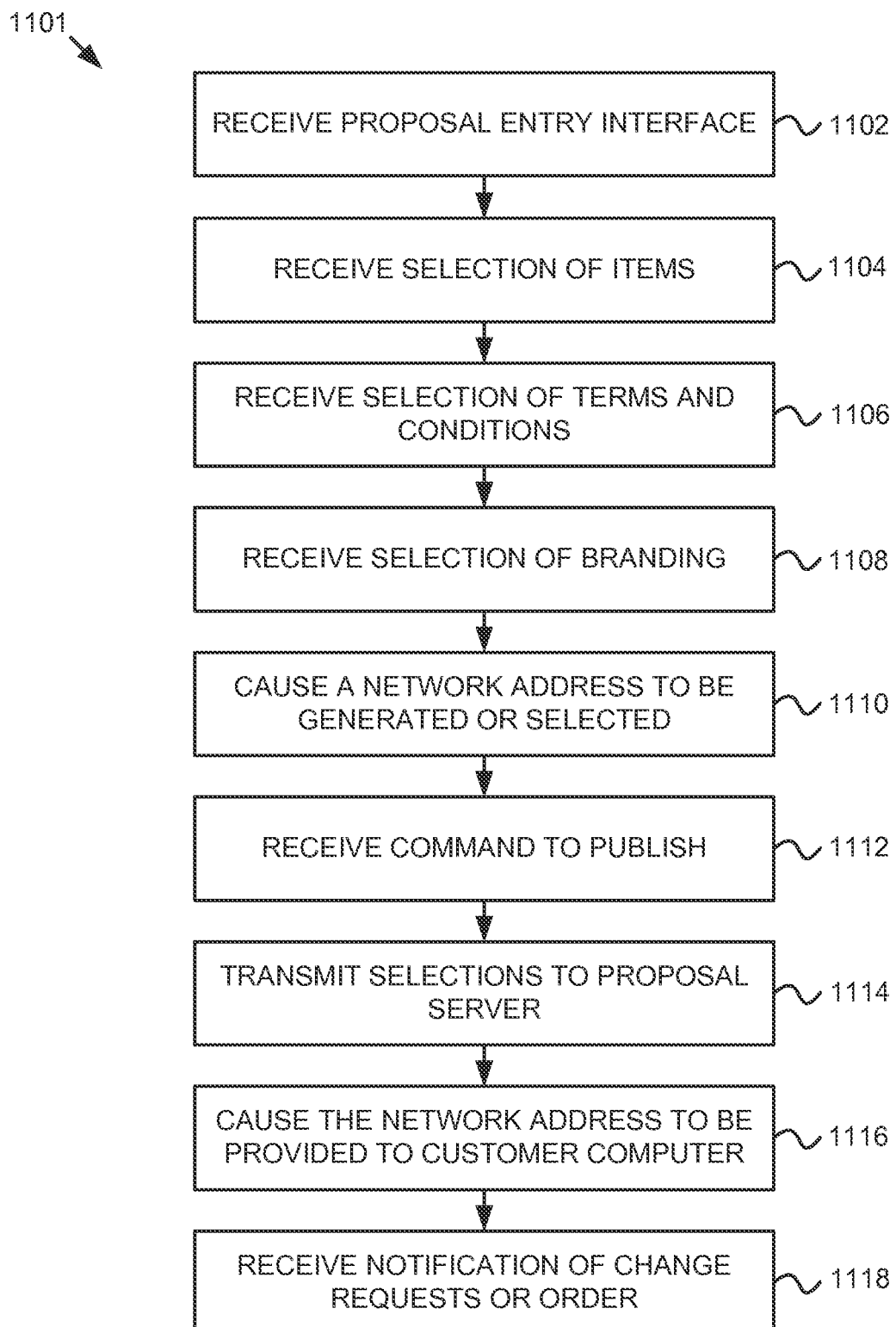
FIG. 11 is a flowchart showing a process for operating a client software application to operate a server-based proposal engine for providing a quote or a proposal to a customer, according to embodiments.

FIG. 11 is a flowchart showing a process 1101 for operating a client software application to operate a server-based proposal engine for providing a quote or a proposal to a customer, according to embodiments. The method 1101 may be visualized in conjunction with FIG. 1A, which shows a proposal engine 116, web server 112, database server 136, and network interface 104 as residing on a server computer 102. A client computer (or other client device) 108 is operatively coupled to the server computer and its resident modules and hardware via a network 110. Not shown is a client network interface configured to transmit and receive messages to and from the server computer via the network 110. The client computer 108 may be configured to run a client software application 114 that may send and receive data to and from the server computer and at least one customer computer 130 via the network 110. The client computer 108 is also equipped with a user interface 122 configured to output information and receive input from a user 120. The user 120 may act as a trusted advisor to the customer 128, and quotes or proposals 118 generated by the user 120, using the system 101, and displayed to the customer 128 may be private or secret proposals that are intended to be viewed only by the customer 128 and/or the customer 128's delegates. The customer computer 130 need not necessarily be a computer per se. For example, the customer computer 130 may include or consist essentially of a smart phone.

Generally speaking, the steps included in the process 1101 are executed using one or more client software applications 114 by the client computer 108 responsive to input from the user 120.

According to embodiments, the client software application may include a web browser configured to display HTML and/or XML objects transmitted from the proposal engine 116 in cooperation with a web server 112. Optionally, the client software application may include a batch or off-line capable application wherein user input may be received when the customer computer is not in communication with the server computer.

The process 1101 may start at step 1102, wherein a proposal entry interface is received via a client network interface.

The process 1101 next proceeds to step 1104, wherein a selection of items for proposal to the customer is received from the user via the user interface 122 into the client software application. The proposal may include a quotation of a price for providing the selected items. Step 1104 may thus include receiving one or more prices for the selected items. According to embodiments, the items may include goods, services, or goods and services.

Receiving the selection of items in step 1104 may include receiving at least two line items, wherein the proposal including the at least two line items will be subsequently viewable at the network address.

The process may next proceed to step 1106, wherein the client software application receives a selection of terms and conditions from the user via the client computer user interface. Optionally, the terms and conditions may include at least one price.

Proceeding to step 1108, the client software application may receive, from the user via the client computer user interface, a selection of branding and/or other content for inclusion in the quote or proposal. For example, branding may be selected by selecting or generating a template for the proposal. Selecting a template may include selecting a default proposal template. Selecting a template may include designing a template, selecting a pre-determined template, and/or modifying a pre-determined template. Selecting a template may include selecting a template identity (ID) rather than selecting a template itself.

Proceeding to step 1110, the client software application may cause a network address to be selected or generated. This may include generating, selecting, or receiving, with the client software application, a Deep Web network address for displaying the proposal. Generating, selecting, or receiving the Deep Web network address may include generating the Deep Web network address with the client software application. Optionally, step 1110 may include generating a portion of the Deep Web network address with the client software application. Optionally, step 1110 may include transmitting a command or request to the proposal engine to select or generate the Deep Web network address. Generating, selecting, or receiving the Deep Web network address in step 1110 may include receiving the Deep Web network address from the proposal engine. Generating, selecting, or receiving, with the client software application, a Deep Web network address for displaying the proposal may further include issuing a command or request to the proposal engine to generate at least a passcode portion of the Deep Web network address. Optionally, the client application may never receive the Deep Web network address. Alternatively, step 1110 may include receiving at least the passcode portion of the Deep Web network address from the proposal engine.

As described elsewhere herein, a Deep Web network address may include a first portion that is indexed by and/or linked from a surface web location accessible by conventional web search engines, and a second portion that is unpredictable and sufficiently long to substantially prevent systematic search. The Deep Web network address may be non-indexed and non-linked. The Deep Web network address may be uncrawlable. In some embodiments, the Deep Web network address does not require registration or login. In other applications, the Deep Web network address may be an address that requires login, such as by presenting a username and/or a password. The Deep Web network address may be a contextual address. The Deep Web network address may be generated by a JavaScript or other randomizing or pseudo-randomizing application.

The Deep Web network address may include a URI including a URL that is indexed; and, associated with the URL, a non-indexed query including a passcode that is generated by a random number or pseudo-random number generator and which provides a path to the proposal.

Optionally, step 1110 may be included in transmitting the selection of items in step 1114, and/or in other steps of the method 1101.

Proceeding to step 1112, the client software application may receive, from the user via the client computer user interface, a command to publish. The command to publish may include an explicit actuation of a GUI object by a user. Alternatively, the command to publish may be implicit in the selection of items in step 1104, in other selections (e.g., selections received in steps 1106, 1108), or in the act of causing a network address to be generated or selected in step 1110.

Proceeding to step 1114, the client software application may transmit the selections received in steps 1104, 1106, and 1108 (and optionally a network address, if generated in the client software application) to the proposal engine via the client computer network interface. Step 1114 may be viewed as causing the proposal to be viewable at the network address, which may be a Deep Web network address. Optionally, step 1114 may include transmitting data, a request, or a command to the server to display the proposal as a web page at the Deep Web network address. Alternatively, the data, request, or command may be implied.

Transmitting a selected proposal template may consist essentially of or include transmitting an identity of the selected proposal template.

As described above, the proposal may use a template that includes a GUI configured to receive input from the customer when the proposal is accessed at the Deep Web network address. Accordingly, step 1114 may include transmitting data, a request, or a command to the server to display the proposal using a template that includes a GUI configured to receive input from the customer when the proposal is accessed at the Deep Web network address.

In step 1116, the client software application causes the network address to be provided or made accessible to the customer computer. Providing the network address to the customer computer allows the customer to view the proposal at the network address. As described elsewhere, the network address may be a Deep Web network address. Optionally, causing the Deep Web network address to be provided to the customer computer for subsequent viewing may include displaying a GUI network address access object at a location accessible to the customer computer.

Step 1116 may include receiving, from the user via the user interface into the client software application, a command to provide the Deep Web network address to the customer computer. Causing the Deep Web network address to be provided to the customer computer for subsequent viewing may be included in receiving, from the user via the user interface into the client software application a command to publish the proposal in step 1112.

Optionally, the Deep Web network address may be transmitted to the customer computer from the client software application or from an email application running on a client computer on which the client software application is also running. Accordingly, causing the Deep Web network address to be provided to the customer computer for subsequent viewing may include causing an email message including the Deep Web network address to be transmitted to the customer computer. Optionally, the email message may be transmitted from a location other than the client computer, such as from the server computer, for example. Optionally, the email message may include branding defined by an email template.

In step 1118, the client software application may receive one or more notifications, via the client computer network interface, of input from the customer responsive the customer viewing the proposal at the network address. For example, the notifications may include a change request, one or more selections, a question, acceptance of the proposal, an order responsive to the proposal, and/or a purchase entered via the GUI. The client software application may then provide to the user, via the user interface, the one or more requests, selections, acceptances, purchases, etc. received from the customer or a summary of one or more of the requests, selections, acceptances, or purchases, etc. received from the customer and entered via the GUI at the Deep Web network address.

Optionally, the process 1101 may loop back to any of the steps of FIG. 11 to allow the user to make changes in the proposal responsive to customer feedback. This may result in modifying one or more of the selections of items, the template, or a price displayed at the Deep Web network address responsive to input from the user. Modifying the proposal may include receiving a selection or approval of the at least one change via the user interface, transmitting at least the change to the server, and causing a notification of the changed proposal to be provided to a customer computer for subsequent viewing at the Deep Web network address.

Optionally, a user may select a proposal template that allows the proposal engine to perform the modification of one or more of the selections of items, the template, or a price displayed at the Deep Web network address responsive to input from the customer. Optionally, the client application may be configured to automatically make such modifications.

While the process 1101 is described above as resulting in the display of a proposal at the network address, it may actually result in two or more proposals. For example, receiving the selection of items in step 1104 and transmitting the selection of items from the client software application to the proposal engine in step 1114 may include respectively receiving and transmitting two or more selections of items. The selections of items (and/or selections of branding, content, or other aspects) may be assigned to respective two or more proposals. The two or more proposals including the respective selections of items may then be subsequently viewable at two or more respective network addresses, such as two or more respective Deep Web network addresses.

Optionally, each of the processes illustrated in FIGS. 8-11 may include automated item selection, price selection, format (template) selection, and/or content selection corresponding to one or more individual identities. Such a method may allow preparation of a personalized quote or proposal. This may, for example, include receiving, from a user, a selection of items for a quote or proposal for a customer; determining at least one of a customer identity or the user identity; selecting at least a content element or a template element for the proposal responsive to one or more of the customer identity and user identity; and displaying the proposal including the selected content element, the selected template element, or the selected content and selected template elements. According to embodiments, the proposal engine 116 may provide this functionality or may cooperate with other elements shown or described in conjunction with FIGS. 1A, 1B to provide the functionality.

According to another embodiment, any of the methods of FIGS. 8-11 may include receiving, selecting, or generating a network address for displaying a quote or proposal to a selected customer; receiving or determining a customer identity corresponding to customer communication address to which the network address is transmitted; and displaying the quote or proposal including at least one item, price, content element, or format element that is selected responsive to the customer identity. The customer identity may include data that corresponds to a known customer name. Alternatively, the customer identity may not include information that can be correlated to an unencrypted customer name. This can preserve anonymity, while still providing a personalized experience for the customer. According to embodiments, the proposal engine 116 may provide this functionality or may cooperate with other elements shown or described in conjunction with FIGS. 1A, 1B to provide the functionality.

According to embodiments, any of the methods of FIGS. 8-11 may include displaying, at a particular network address, a quote or proposal including one or more graphical customer interface objects for receiving input from a customer; receiving input from the customer using at least one of the graphical customer interface objects; and reporting, to a user, a status of the quote or proposal corresponding to the received input from the customer. According to embodiments, the proposal engine 116 may provide this functionality or may cooperate with other elements shown or described in conjunction with FIGS. 1A, 1B to provide the functionality.

The user or a user organization may have significant control over quotes or proposals that are presented to customers. For example, any of the methods illustrated by FIGS. 8-11 may include receiving data corresponding to a quote or proposal; determining a user or a user organization corresponding to the person that input the data corresponding to the quote or proposal; determining at least one rule related to content, format, or price corresponding to the user or user organization; and applying the at least one rule to produce a quote or proposal that is compliant with the rule. Similarly, customers or customer organizations may exercise at least some control over quotes and proposals that are received. For example, any of the methods illustrated by FIGS. 8-11 may include receiving data corresponding to a quote or proposal; determining a customer or customer organization corresponding to a person or organization for whom the quote or proposal was prepared; determining at least one rule related to content, format, or price corresponding to the customer or customer organization; and applying the at least one rule to produce a quote or proposal that is compliant with the rule. According to embodiments, the proposal engine 116 may provide this functionality or may cooperate with other elements shown or described in conjunction with FIGS. 1A, 1B to apply the rules as indicated above.

Throughout the disclosure, figures, and claims herein, reference is made to a customer. According to embodiments, the term customer is to be understood to mean a person or selected individuals to whom a quote or proposal is or is to be presented. The person or selected individuals need not actually purchase or need not have purchased in the past. To avoid cumbersome language, the term customer is used to encompass customers, prospective customers, influencers, consultants, approvers, and/or companies or organizations for whom the quote or proposal is prepared.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A method for preparing an automated quote or proposal, comprising:
receiving, from a user via a user interface into a client software application, a selection of items for a proposal to a customer;
transmitting, from the client software application via a network interface to a server, the selection of items, wherein the proposal including the selection of items will be subsequently viewable at a Deep Web network address not indexed by search engines; and causing the Deep Web network address to be provided to or made accessible to a customer computer for subsequent viewing.

2. The method for preparing an automated quote or proposal of claim 1, further comprising:

receiving, from a user via the user interface into the client software application, a command to publish the proposal including the selection of items.

3. The method for preparing an automated quote or proposal of claim 2, wherein the command to publish includes an explicit actuation of a graphical user interface (GUI) object by a user.

4. The method for preparing an automated quote or proposal of claim 2, wherein the command to publish is implicit in the selection of items.

5. The method for preparing an automated quote or proposal of claim 1, further comprising:

receiving, from the user via the user interface, a selection of a proposal template; and transmitting from the client software application via the network interface to the proposal engine, the selected proposal template or an identity of the selected proposal template.

6. The method for preparing an automated quote or proposal of claim 1, wherein receiving the selection of items includes receiving at least two line items; and wherein the proposal including the at least two line items will be subsequently viewable at the network address.

7. The method for preparing an automated quote or proposal of claim 1, wherein causing the Deep Web network address to be provided to the customer computer for subsequent viewing includes receiving, from the user via the user interface into the client software application a command to publish the proposal.

8. The method for preparing an automated quote or proposal of claim 1, wherein causing the Deep Web network address to be provided to the customer computer includes transmitting the Deep Web network address to the customer computer from the client software application or from an email application running on a client computer on which the client software application is also running.

9. The method for preparing an automated quote or proposal of claim 1, wherein causing the Deep Web network address to be provided to the customer computer for subsequent viewing includes causing an email message including the Deep Web network address to be transmitted to the customer computer.

10. The method for preparing an automated quote or proposal of claim 9, further comprising:

causing the email message to include branding defined by an email template.

11. The method for preparing an automated quote or proposal of claim 1, wherein causing the Deep Web network address to be provided to the customer computer for subsequent viewing includes displaying a GUI network address access object at a location accessible to the customer computer.

12. The method for preparing an automated quote or proposal of claim 1, wherein the Deep Web network address is a contextual address.

13. The method for preparing an automated quote or proposal of claim 1, wherein the Deep Web network address is generated by a JavaScript or other randomizing or pseudo-randomizing application.

14. The method for preparing an automated quote or proposal of claim 1, wherein the Deep Web network address comprises:

a Uniform Resource Identifier (URI) including a Uniform Resource Locator (URL) that is indexed; and associated with the URL, a non-indexed query including a passcode that is generated by a random number or pseudo-random number generator and which provides a path to the proposal.

15. The method for preparing an automated quote or proposal of claim 1, further comprising:

transmitting data, a request, or a command to the server to display the proposal as a web page at the Deep Web network address.

16. The method for preparing an automated quote or proposal of claim 1, further comprising transmitting data, a request, or a command to the server to display the proposal using a template that includes a graphical user interface (GUI) configured to receive input from the customer when the proposal is accessed at the Deep Web network address.

17. The method for preparing an automated quote or proposal of claim 1, wherein transmitting the selection of items from the client software application to the proposal engine includes transmitting two or more selections of items; and wherein two or more proposals including the respective selections of items will be subsequently viewable at two or more respective Deep Web network addresses.

18. The method for preparing an automated quote or proposal of claim 1, further comprising receiving, via the network interface from the proposal engine or the customer computer, a notification of a proposal acceptance.

19. The method for preparing an automated quote or proposal of claim 1, further comprising:

receiving, via a network interface from the server or the customer computer, a notification of a request for at least one change in the proposal.

20. The method for preparing an automated quote or proposal of claim 19, further comprising:

receiving a selection or approval of the at least one change via the user interface;

transmitting at least the change to the server; and causing a notification of the changed proposal to be provided to a customer computer for subsequent viewing at the Deep Web network address.

\* \* \* \* \*